United States Patent
Karino et al.

(10) Patent No.: US 8,446,828 B2
(45) Date of Patent: May 21, 2013

(54) METHOD AND SYSTEM FOR CONTROLLING COMMUNICATION NETWORK AND ROUTER USED IN THE NETWORK

(75) Inventors: Shuichi Karino, Tokyo (JP); Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 490 days.

(21) Appl. No.: 11/783,475

(22) Filed: Apr. 10, 2007

(65) Prior Publication Data

US 2007/0189213 A1 Aug. 16, 2007

Related U.S. Application Data

(62) Division of application No. 10/056,005, filed on Jan. 28, 2002, now Pat. No. 7,327,671.

(30) Foreign Application Priority Data

| Jan. 26, 2001 | (JP) | 2001-018589 |
| Jan. 29, 2001 | (JP) | 2001-020198 |
| Feb. 2, 2001 | (JP) | 2001-027048 |

(51) Int. Cl.

| G06F 15/16 | (2006.01) |
| G06F 15/173 | (2006.01) |
| G06F 11/00 | (2006.01) |
| H04W 4/00 | (2009.01) |
| H04L 1/00 | (2006.01) |
| H04L 12/26 | (2006.01) |
| H04J 1/16 | (2006.01) |
| G08C 15/00 | (2006.01) |
| G01R 31/08 | (2006.01) |

(52) U.S. Cl.
USPC ........... 370/235; 370/338; 370/328; 370/229; 709/235; 709/238

(58) Field of Classification Search .................. 370/338, 370/328, 229, 235; 709/235, 238
See application file for complete search history.

(56) References Cited

U.S. PATENT DOCUMENTS

| 4,769,811 A | 9/1988 | Eckberg et al. |
| 4,818,984 A | 4/1989 | Chang et al. |
| 4,885,742 A | 12/1989 | Yano |
| 4,912,703 A | 3/1990 | Sumida |

(Continued)

FOREIGN PATENT DOCUMENTS

| EP | 1011231 A2 | 6/2000 |
| EP | 1011242 A1 | 6/2000 |

(Continued)

OTHER PUBLICATIONS

Hawaii: A Domain-Based Approach for Supporting Mobility in Wide-Area Wireless Networks, R. Ramjee et al., pp. 1-25.

(Continued)

*Primary Examiner* — Jinsong Hu
*Assistant Examiner* — Opiribo Georgewill
(74) *Attorney, Agent, or Firm* — Young & Thompson

(57) ABSTRACT

The present invention provides a communication network comprising a host network, a plurality of base stations, at least a mobile host capable of establishing links to the base stations, and a hierarchy-network of plural routers which are improved in transferring performances for ensuring continuous operations with a reduced load without packet loss.

16 Claims, 18 Drawing Sheets

U.S. PATENT DOCUMENTS

| | | | |
|---|---|---|---|
| 5,245,609 | A | 9/1993 | Ofek et al. |
| 5,280,470 | A | 1/1994 | Buhrke et al. |
| 5,371,731 | A * | 12/1994 | Pratt et al. ............... 370/216 |
| 5,434,853 | A | 7/1995 | Hemmady et al. |
| 5,473,599 | A | 12/1995 | Li et al. |
| 5,793,978 | A | 8/1998 | Fowler |
| 6,148,410 | A | 11/2000 | Baskey et al. |
| 6,169,735 | B1 | 1/2001 | Allen et al. |
| 6,389,532 | B1 * | 5/2002 | Gupta et al. ............... 713/163 |
| 6,515,963 | B1 | 2/2003 | Bechtolsheim et al. |
| 6,724,721 | B1 * | 4/2004 | Cheriton ............... 370/229 |
| 6,741,564 | B2 | 5/2004 | Luddy |
| 6,751,191 | B1 | 6/2004 | Kanekar et al. |
| 2002/0046287 | A1 * | 4/2002 | La Porta et al. ............... 709/230 |

FOREIGN PATENT DOCUMENTS

| | | |
|---|---|---|
| JP | 2-127828 | 5/1990 |
| JP | 5-41691 | 2/1993 |
| JP | A5-48635 | 2/1993 |
| JP | A5-63722 | 3/1993 |
| JP | B2 6-3592 | 1/1994 |
| JP | 9-27808 | 1/1997 |
| JP | A 9-252480 | 9/1997 |
| JP | A 9-261713 | 10/1997 |
| JP | A 9-321789 | 12/1997 |
| JP | 10-84382 | 2/1998 |
| JP | 10-502229 | 2/1998 |
| JP | 10-94016 | 4/1998 |
| JP | A 10-1364626 | 5/1998 |
| JP | A 2000-217137 | 5/1998 |
| JP | A-11-146442 | 5/1999 |
| JP | A 11-261561 | 9/1999 |
| JP | A 11-331208 | 11/1999 |
| JP | 11/355281 | 12/1999 |
| JP | A 2000-49818 | 2/2000 |
| JP | 2000-152303 | 5/2000 |
| JP | A 2000-183975 | 6/2000 |
| JP | B2 3087949 | 7/2000 |
| JP | 2000-295278 | 10/2000 |
| JP | 2000-324154 | 11/2000 |
| JP | A 2000-341316 | 12/2000 |
| JP | A 2002-125254 | 4/2002 |
| WO | 00/54475 | 9/2000 |
| WO | 00/72485 A1 | 11/2000 |

OTHER PUBLICATIONS

"Design, Implementation, and Evaluation of Cellular IP," IEEE Personal Communications, Andrew T. Campbell et al., Aug. 2000, pp. 42-49.

"Cellular IP: A New Approach to Internet Host Mobility," Computer Communication Review, Association for Computing Machinery, Andras G.Valko, 1999, pp. 50-65.

"Fast and Scalable Wireless Handoffs in Support of Mobile Internet Audio," Mobile Networks and Applications 3, 1998, pp. 351-363.

"Automobile Tracking System by using DSRC IPv6 network", Mizukoshi et al., Dec. 1, 2000, vol. 2000, No. 112, ISSN, pp. 105-112.

"Software Simulation of iP Handover for DSRC Network", Feb. 14, 2001, vol. 2001, No. 13, ISSN, pp. 55-62.

"A Study of Fast Hand-over Method with Layer 2 Function over Mobile IP Backbone," Oct. 27, 2000, vol. 100, No. 398, ISSN, pp. 43-48.

"Fast Handoffs in MIPv6, Internet-Draft," Karim El-Maiki et al., Sep. 2000, pp. 1-9.

"Selective Back-pressure in Switched Ethernet LANS", Noureddine et al., Global Telecommunications Conference—Globecome '99, 0-7803-5796-5/99; (pp. 1256-1263).

"Transmission Control Protocol, DARPA Internet Program Protocol Specification," Information Sciences Institute, University of Southern California, Marina del Rey, California, Sep. 1981. pp. 3, 9.

* cited by examiner

METHOD AND SYSTEM FOR CONTROLLING COMMUNICATION NETWORK AND ROUTER USED IN THE NETWORK

BACKGROUND OF THE INVENTION

1. Field of the Invention

The present invention relates to a method and a system for controlling a communication network and routers used in the network, and more particularly to a system and method for controlling call to mobile host through a mobile communication hierarchical network as well as another system and method for controlling a mobile communication hierarchical network.

2. Description of the Related Art

FIG. 1 is a block diagram illustrative of a conventional mobile communication network. This mobile communication network is generally used for a management system for managing positions of mobile telephones or automatic cars. This mobile communication network utilizes transmission control protocol/internet protocol (TCP/IP) for realizing a packet communication.

As shown in FIG. 1, the mobile communication network includes a host network 1, plural routers Rn (n=1~7), base stations BS1~BS8, and a mobile host MH. The host network 1 may comprise a wide area network such as internet. The routers Rn provide multi-point connections between the host network 1 and the base stations BS1~BS8. The routers Rn form a hierarchical network structure between the host network 1 and the base stations BS1~BS8. The router R1 is highest level router. The routers R2 and R3 are middle level routers which are connected to the router R1 and dominated by the router R1. The routers R4, R5, R6 and R7 are lowest level routers, wherein the routers R4 and R5 are connected to the router R2 and dominated by the router R2, whilst the routers R6 and R7 are connected to the router R3 and dominated by the router R3. The base stations BS1 and BS2 are connected to the router R4 and dominated by the router R4. The base stations BS3 and BS4 are connected to the router R5 and dominated by the router R5. The base stations BS5 and BS6 are connected to the router R6 and dominated by the router R6. The base stations BS7 and BS8 are connected to the router R7 and dominated by the router R7.

The mobile host MH is connected through radio communication to any one of the base stations BS1~BS8 to establish a link to the base station for communication through the host network 1 to other subscriber.

In accordance with this mobile communication network, the mobile host MH is managed in the current position thereof in activated state, or the mobile host MH is managed in paging area in inactivated state.

The routers R2 and R3 manage the respective paging areas. In FIG. 1, the mobile host MH is positioned in an area covered by the base stations BS1, BS2, BS3 and BS4, for which reason the mobile host MH is recorded in the paging area dominated by the router R2. If the mobile host MH moves from the first paging area dominated by the base stations BS1, BS2, BS3 and BS4 which are further dominated by the router R2 into a second paging area dominated by the base stations BS5, BS6, BS7 and BS8 which are further dominated by the router R3, then the router R3 registers the mobile host MH in the second paging area in accordance with a position recording message from the mobile host MH.

As shown in FIG. 1, it is assumed that the mobile host MH is recorded in the first paging area managed by the router R2. If a packet addressed to the mobile host MH for general calling is transmitted from a caller through the host network 1 to the router R1, then the router R1 selectively transfers the packet for the mobile host MH to the router R2 in the first step (1). The router R2 transfers the packet to all of the sub-ordinate routers R4 and R5 which are managed or dominated by the router R2 in the second step (2). The routers R4 and R5 further transfer the packet to all of the base stations BS1, BS2, BS3 and BS4 which are managed by the routers R4 and R5 in the third step (3).

The base stations BS1, BS2, BS3 and BS4 perform general calling to the mobile host MH, whereby any connectable one of the base stations BS1, BS2, BS3 and BS4 establishes a link to the mobile host MH in the fourth step (4). In FIG. 1, the base station BS3 established the link to the mobile host MH. The mobile host MH transmits a position recording message to the base station BS3 in the fifth step (5). The base station BS3 transfers the position recording message to the router R5 in the sixth step (6). The router R5 further transfers the position recording message to the router R2 as well as updates routing information to the mobile host MH in the seventh step (7). The router R2 updates routing information to the mobile host MH. As a result, the communication route of the router R1, the router R2, the router R5 and the base station BS3 is established. The routing information is an information which indicates a route up to a packet-destination. The routing information is recorded on a routing table of the router.

FIG. 2 is a sequence diagram illustrative of sequential operations of the above described conventional mobile communication hierarchical network shown in FIG. 1. As shown in FIG. 2, if the packets are discontinuously transmitted from the host network 1, then the routers R1, R2, R4 and R5 transfer the received packets to the subordinate routers or the managing base stations BS every time when the packets are transmitted from the host network 1 until any link is established between the base station and the mobile host MH.

As described above, in accordance with the conventional mobile communication hierarchical network, if the packet addressed to the mobile host MH in the stand-by state is transmitted from the caller through the host mobile MH, then the router managing the paging area, on which the stand-by state mobile host MH is recorded, performs the general calling the sub-ordinate network managed by this router for calling the host mobile MH, wherein the packet addressed to the mobile host MH is transferred to all of the base stations managed by this router.

It is, however, general that the caller transmits the packets through the host network 1 without consideration of loads to the hierarchical network, whereby the packet for general calling to the mobile host MH causes the increase in the load to the hierarchical network.

FIG. 3 is a block diagram illustrative of another conventional mobile communication network. This mobile communication network is generally used for a management system for managing positions of mobile telephones or automatic cars. This mobile communication network utilizes transmission control protocol/internet protocol (TCP/IP) for realizing a packet communication.

As shown in FIG. 3, the mobile communication network includes a host network 1, plural routers Rn (n=1~7), base stations BS1~BS8, and a mobile host MH. The host network 1 may comprise a wide area network such as internet. The routers Rn provide multi-point connections between the host network 1 and the base stations BS1~BS8. The routers Rn form a hierarchical network structure between the host network 1 and the base stations BS1~BS8. The router R1 is highest level router. The routers R2 and R3 are middle level routers which are connected to the router R1 and dominated by the router R1. The routers R4, R5, R6 and R7 are lowest level routers, wherein the routers R4 and R5 are connected to the router R2 and dominated by the router R2, whilst the routers R6 and R7 are connected to the router R3 and dominated by the router R3. The base stations BS1 and BS2 are connected to the router R4 and dominated by the router R4. The base stations BS3 and BS4 are connected to the router R5 and dominated by the router R5. The base stations BS5 and BS6 are connected to the router R6 and dominated by the router R6. The base stations BS7 and BS8 are connected to the router R7 and dominated by the router R7.

The mobile host MH is connected through radio communication to any one of the base stations BS1~BS8 to establish a link to the base station for communication through the host network 1 to other subscriber.

The mobile host MH transmits a position recording message to the base station BS2 in the first step (1). The routers Rn update the respective routing informations based on the position recording message from the mobile host MH and also transfer the position recording message to the upper level routers in the second, third and fourth steps (2), (3) and (4). The routing information is an information which indicates a route up to a packet-destination. The routing information is recorded on a routing table of the router.

When the position recording message reaches the top level router R1, a communication route between the host network 1 and the mobile host MH is established. In FIG. 3, the communication route as established includes the mobile host MH, the base station BS2, the router R4, the router R2 and the router R1. FIG. 4 is a block diagram illustrative of communication processes of the conventional mobile communication network of FIG. 3. As shown in FIG. 4, the packet addressed to the mobile host MH is transferred from the host network 1 through the router R1, the router R2, the router R4 and the base station BS2 to the mobile host MH sequentially.

If, accidentally, at least one router on the established communication route between the host network 1 and the mobile host MH becomes failure, then the communication route becomes disconnect. This conventional communication network has no further available route between the base station BS2 and the host network 1. For this reason, it is necessary to reset the failure router and re-establish the communication network between the host network 1 and the mobile host MH before the communication route between the mobile host MH and the host network 1 is established by re-updating process by the routers Rn for re-updating the routing information based on the position record message from the mobile host MH. If at least any one of the router on the established communication route becomes once trouble and the communication route becomes lost, then no communication can be made between the mobile host MH and the host network 1 until the communication route between the mobile host MH and the host network 1 is re-established by re-updating process by the routers Rn for re-updating the routing information based on the position record message from the mobile host MH.

In FIGS. 3 and 4, only the single mobile host MH is shown, even actually a plurality of the mobile host MH are generally the subject to the communication through the above network. The plural mobile hosts MH transmit respective plural position recording messages which are transferred through the hierarchy-networked routers Rn to the host network 1 for re-establishment of the communication route. The upper level router is likely to receive many position recording messages from the plural mobile hosts MH. This means that the transmissions of the many position recording messages from the many mobile hosts MH increases the load to the upper level router.

As described above, if at least any one of the router on the established communication route becomes once trouble and the communication route becomes lost, then no communication can be made between the mobile host MH and the host network 1 until the communication route between the mobile host MH and the host network 1 is re-established by re-updating process by the routers Rn for re-updating the routing information based on the position record message from the mobile host MH.

Further, the plural mobile hosts MH transmit respective plural position recording messages which are transferred through the hierarchy-networked routers Rn to the host network 1 for re-establishment of the communication route. The upper level router is likely to receive many position recording messages from the plural mobile hosts MH. This means that the transmissions of the many position recording messages from the many mobile hosts MH increases the load to the upper level router.

FIG. 5 is a block diagram illustrative of still another conventional mobile communication network. This mobile communication network is generally used for a management system for managing positions of mobile telephones or automatic cars. This mobile communication network utilizes transmission control protocol/internet protocol (TCP/IP) for realizing a packet communication.

As shown in FIG. 5, the mobile communication network includes a host network 1, plural routers Rn (n=1~7), base stations BS1~BS8, and a mobile host MH. The host network 1 may comprise a wide area network such as internet. The routers Rn provide multi-point connections between the host network 1 and the base stations BS1~BS8. The routers Rn form a hierarchical network structure between the host network 1 and the base stations BS1~BS8. The router R1 is highest level router. The routers R2 and R3 are middle level routers which are connected to the router R1 and dominated by the router R1. The routers R4, R5, R6 and R7 are lowest level routers, wherein the routers R4 and R5 are connected to the router R2 and dominated by the router R2, whilst the routers R6 and R7 are connected to the router R3 and dominated by the router R3. The base stations BS1 and BS2 are connected to the router R4 and dominated by the router R4. The base stations BS3 and BS4 are connected to the router R5 and dominated by the router R5. The base stations BS5 and BS6 are connected to the router R6 and dominated by the router R6. The base stations BS7 and BS8 are connected to the router R7 and dominated by the router R7.

The mobile host MH is connected through radio communication to any one of the base stations BS1~BS8 to establish a link to the base station for communication through the host network 1 to other subscriber.

The mobile host MH transmits a position recording message to the base station BS linked to this mobile host MH in a first step (1). The position recording message is transferred from the linked base station through the routers from the lowest level to the highest level, thereby establishing the communication route between the host network 1 and the linked base station BS. The routing information is an information which indicates a route up to a packet-destination. The routing information is recorded on a routing table of the router.

For example, as shown in FIG. 5, a communication route has been established which includes the router R1, the router R2, the router R4, and the base station BS2 linked to the mobile host MH. The packet addressed to the mobile host 1 is transmitted from the host network 1 to the router R1. The router R1 transfers the received packet to the router R2 based on the routing information held itself in the first step (1'). The router R2 transfers the received packet to the router R4 based on the routing information held itself in the second step (2'). The router R4 transfers the received packet to the base station BS2 based on the routing information held itself in the third step (3'). The base station BS2 transmits the received packet to the mobile host MH. Namely, the packet is transferred from the host network 1 through the router R1, the router R2, the router R4 and the base station BS2 to the mobile host MH.

FIG. 6 is a block diagram illustrative of operation of the conventional mobile communication network of FIG. 5. The mobile host MH moves from a radio area covered by the base station BS2 to another radio area covered by the base station BS3. Adjacent two radio areas covered by the adjacent two base stations are generally bounded by an overlap boundary area, even this overlap boundary area is not illustrated in FIG. 6. The mobile host MH establishes a link to the base station providing a highest radio intensity that is sensed by the mobile host MH.

When the mobile host MH moves from the area covered by the base station BS2 to the other area covered by the base station BS3, then the mobile host MH has lost the link to the base station BS2 and establishes a link to the base station BS3. The mobile host MH further transmits a new position recording message to the base station BS3. The base station BS3 transfers the received new position recording message to the router R5. The router R5 further transfers the received new position recording message to the router R2. The router R2 further transfers the received new position recording message to the router R1. As a result, a new communication route is established which includes the host network 1, the router R1, the router R2, the router R5 and the base station BS3 to the mobile host MH.

If the mobile host MH moves from the radio area covered by the base station BS2 to the other radio area covered by the base station BS3 during the transfer of the packet through the hierarchical-structure of the routers Rn, then the packet is transferred through the old communication route including the router R4 and the base station BS2, because a newly communication route including the router R5 and the base station BS3 could not be established. Since the mobile host MH has lost the old link to the base station BS2 and has already established a new link to the base station BS3, then the mobile host MH could not receive the packet from by the base station BS2.

Accordingly, in accordance with the conventional mobile communication network, if the base station having the current link to the mobile host MH is changed to the other base station establishing a new link to the mobile host MH, during the transfer of the packet through the mobile communication network, then the mobile host MH could not receive the packet. Namely, a problem with the packet loss is raised. It is desirable to reduce the probability of rising the problem with the packet loss.

In the above circumstances, the development of novel method and system for controlling the mobile communication hierarchical network free from the above problems is desirable.

SUMMARY OF THE INVENTION

Accordingly, it is an object of the present invention to provide a novel method for controlling the mobile communication hierarchical network free from the above problems.

It is a further object of the present invention to provide a novel method for controlling the mobile communication hierarchical network which reducing a load to the network.

It is a still further object of the present invention to provide a novel method for controlling the mobile communication hierarchical network which reducing a load to the network in general calling.

It is yet a further object of the present invention to provide a novel system for controlling the mobile communication hierarchical network free from the above problems.

It is a further more object of the present invention to provide a novel system for controlling the mobile communication hierarchical network which reducing a load to the network.

It is still more object of the present invention to provide a novel system for controlling the mobile communication hierarchical network which reducing a load to the network in general calling.

It is more over object of the present invention to provide a novel method for controlling the mobile communication hierarchical network which allows continuation in communication between the mobile host and the host network even if at least one router or line has become trouble and the established communication route has lost.

It is another object of the present invention to provide a novel method for controlling the mobile communication hierarchical network which temporary generates a by-pass route to the communication route for allowing continuation in communication between the mobile host and the host network after at least one router or line has become trouble and the established communication route has lost and until the communication route is re-established.

It is still another object of the present invention to provide a novel system for controlling the mobile communication hierarchical network which allows continuation in communication between the mobile host and the host network even if at least one router or line has become trouble and the established communication route has lost.

It is yet another object of the present invention to provide a novel system for controlling the mobile communication hierarchical network which temporary generates a by-pass route to the communication route for allowing continuation in communication between the mobile host and the host network after at least one router or line has become trouble and the established communication route has lost and until the communication route is re-established.

It is further another object of the present invention to provide a novel method for controlling the mobile communication hierarchical network which is capable of reducing the probability of packet loss.

It is further more another object of the present invention to provide a novel method for controlling the mobile communication hierarchical network which allows a mobile host to receive a packet from a new base station newly linked to the mobile host even if the mobile host MH moves from an old radio area covered by an old base station to a new radio area covered by the new base station during transfer of the packet through the mobile communication network.

It is an additional object of the present invention to provide a novel method for controlling the mobile communication hierarchical network which is capable of reducing a traffic of the host network.

It is a further additional object of the present invention to provide a novel method for controlling the mobile communication hierarchical network which is capable of reducing a traffic of the hierarchical network of routers.

It is a still further additional object of the present invention to provide a novel method for controlling the mobile communication hierarchical network which is capable of managing receipts of packets.

It is a yet further additional object of the present invention to provide a novel method for controlling the mobile communication hierarchical network which allows the hierarchical network of routers to exhibit a high performance.

It is furthermore additional object of the present invention to provide a novel method for controlling the mobile communication hierarchical network which improves a transfer efficiency of the packets with avoiding duplicate receipts of the packets by the mobile host.

It is also an object of the present invention to provide a novel system for controlling the mobile communication hierarchical network which is capable of reducing the probability of packet loss.

It is also an object of the present invention to provide a novel system for controlling the mobile communication hierarchical network which allows a mobile host to receive a packet from a new base station newly linked to the mobile host even if the mobile host MH moves from an old radio area covered by an old base station to a new radio area covered by the new base station during transfer of the packet through the mobile communication network.

It is also an object of the present invention to provide a novel system for controlling the mobile communication hierarchical network which is capable of reducing a traffic of the host network.

It is also an object of the present invention to provide a novel system for controlling the mobile communication hierarchical network which is capable of reducing a traffic of the hierarchical network of routers.

It is also an object of the present invention to provide a novel system for controlling the mobile communication hierarchical network which is capable of managing receipts of packets.

It is also an object of the present invention to provide a novel system for controlling the mobile communication hierarchical network which allows the hierarchical network of routers to exhibit a high performance.

It is also an object of the present invention to provide a novel system for controlling the mobile communication hierarchical network which improves a transfer efficiency of the packets with avoiding duplicate receipts of the packets by the mobile host.

It is also an object of the present invention to provide a novel router included in a hierarchical network of the mobile communication hierarchical network which is capable of reducing the probability of packet loss.

It is also an object of the present invention to provide a novel router included in a hierarchical network of the mobile communication hierarchical network which allows a mobile host to receive a packet from a new base station newly linked to the mobile host even if the mobile host MH moves from an old radio area covered by an old base station to a new radio area covered by the new base station during transfer of the packet through the mobile communication network.

It is also an object of the present invention to provide a novel router included in a hierarchical network of the mobile communication hierarchical network which is capable of reducing a traffic of the host network.

It is also an object of the present invention to provide a novel router included in a hierarchical network of the mobile communication hierarchical network which is capable of reducing a traffic of the hierarchical network of routers.

It is also an object of the present invention to provide a novel router included in a hierarchical network of the mobile communication hierarchical network which is capable of managing receipts of packets.

It is also an object of the present invention to provide a novel router included in a hierarchical network of the mobile communication hierarchical network which allows the hierarchical network of routers to exhibit a high performance.

It is also an object of the present invention to provide a novel router included in a hierarchical network of the mobile communication hierarchical network which improves a transfer efficiency of the packets with avoiding duplicate receipts of the packets by the mobile host.

The present invention provides a communication network comprising: a host network; a plurality of base stations; at least a mobile host capable of establishing links to the base stations; and a hierarchy-network of plural routers providing multiple-point routings between the base stations and the host network, and the routers including at least a page-area managing router for managing at least a page area for recording the mobile host, wherein the page-area managing router limits, within a predetermined number, the number of transfer-acceptable packets in packets received in a predetermined time period, so that the page-area managing router transfers only the transfer-acceptable packets to sub-ordinate routers managed by the page-area managing router, and the page-area managing router does not transfer exceeding transfer-requested packets received additionally to the transfer-acceptable packets in the predetermined time period.

The present invention also provides a communication network comprising: a host network; a plurality of base stations; at least a mobile host capable of establishing links to the base stations; and a hierarchy-network of plural router-sets providing multiple-point routings between the base stations and the host network, wherein each of the router-sets further includes plural associated routers which provide the same communication route and which have the same routing informations, and normally selected one of the associated routers in each router set is operational to provide the communication route, and if the normally selected one of the associated routers becomes trouble or inoperational, then other of the associated routers is alternatively selected to be operational to provide the communication route, thereby allowing continuous communication between the at least mobile host and the host network.

The present invention also provides a communication network comprising: a host network; a plurality of base stations; at least a mobile host capable of establishing links to the base stations; and a hierarchy-network of plural routers providing multiple-point routings between the base stations and the host network, wherein at least one of the routers becomes selectively performing as a multicast router for transferring a packet to not only a first base station which has currently been linked to the mobile host but also at least a second base station adjacent to the first base station, and the second base station has currently been unlinked to the mobile host.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
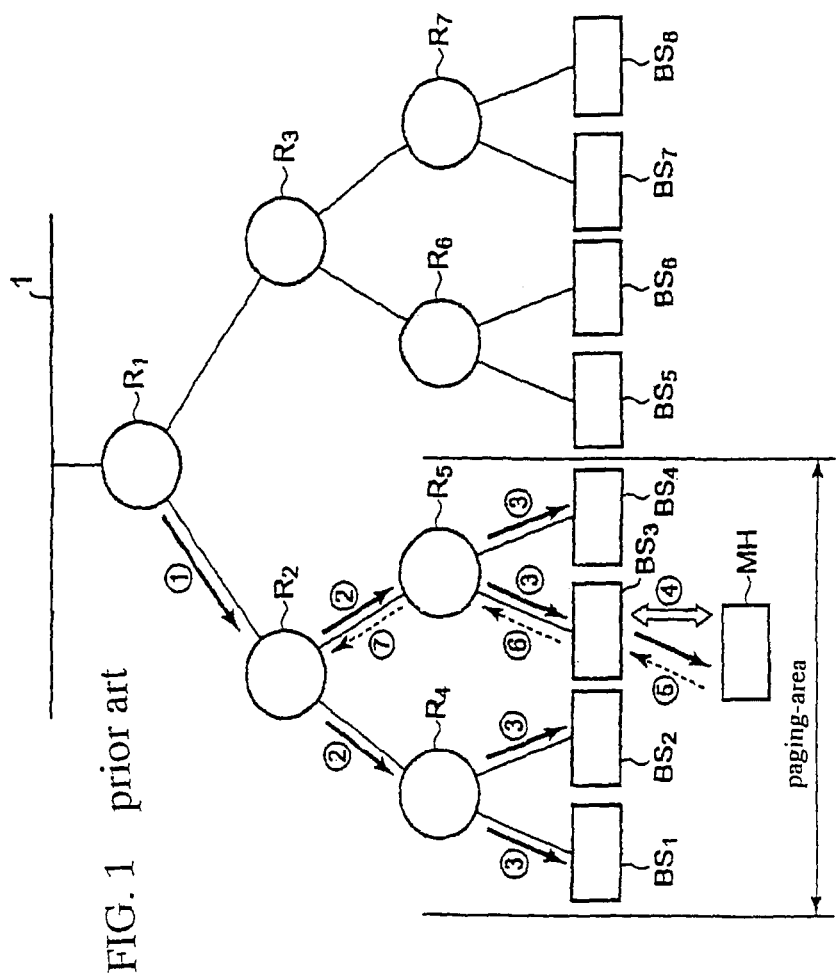
FIG. 1 is a block diagram illustrative of a conventional mobile communication network.
Figure 2:
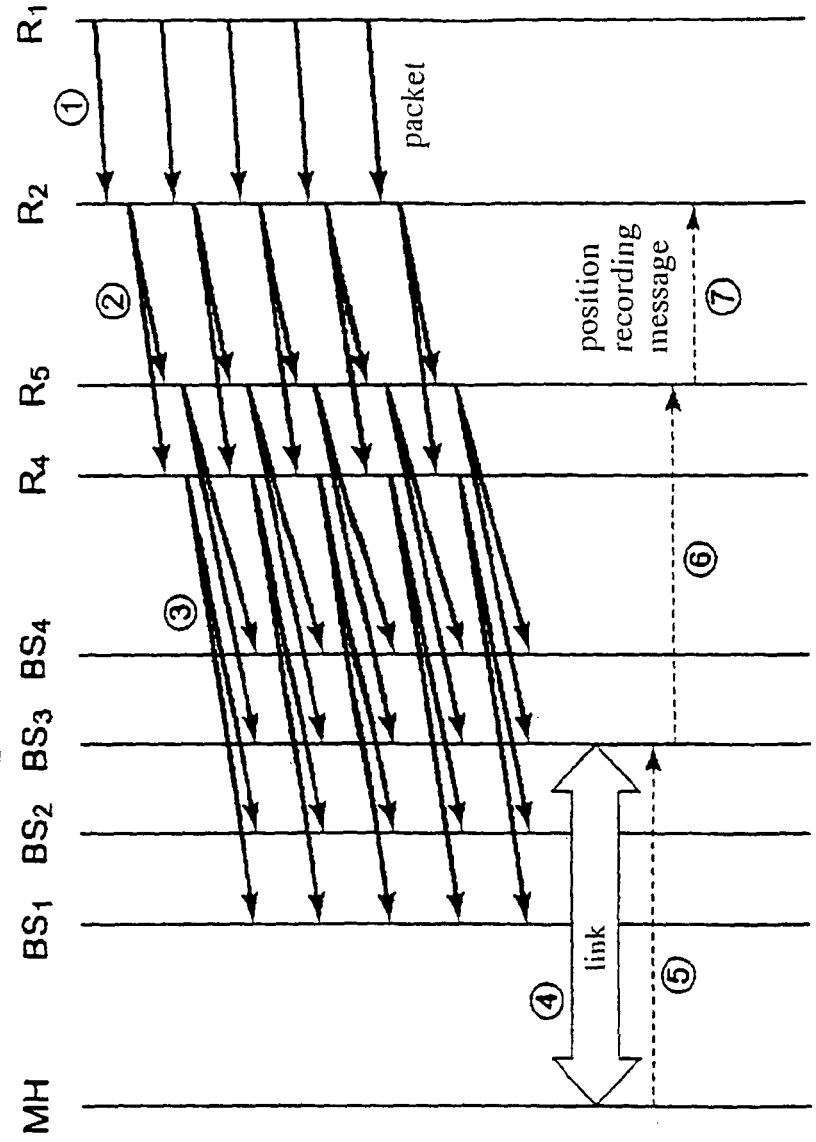
FIG. 2 is a sequence diagram illustrative of sequential operations of the above described conventional mobile communication hierarchical network shown in FIG. 1.
Figure 3:
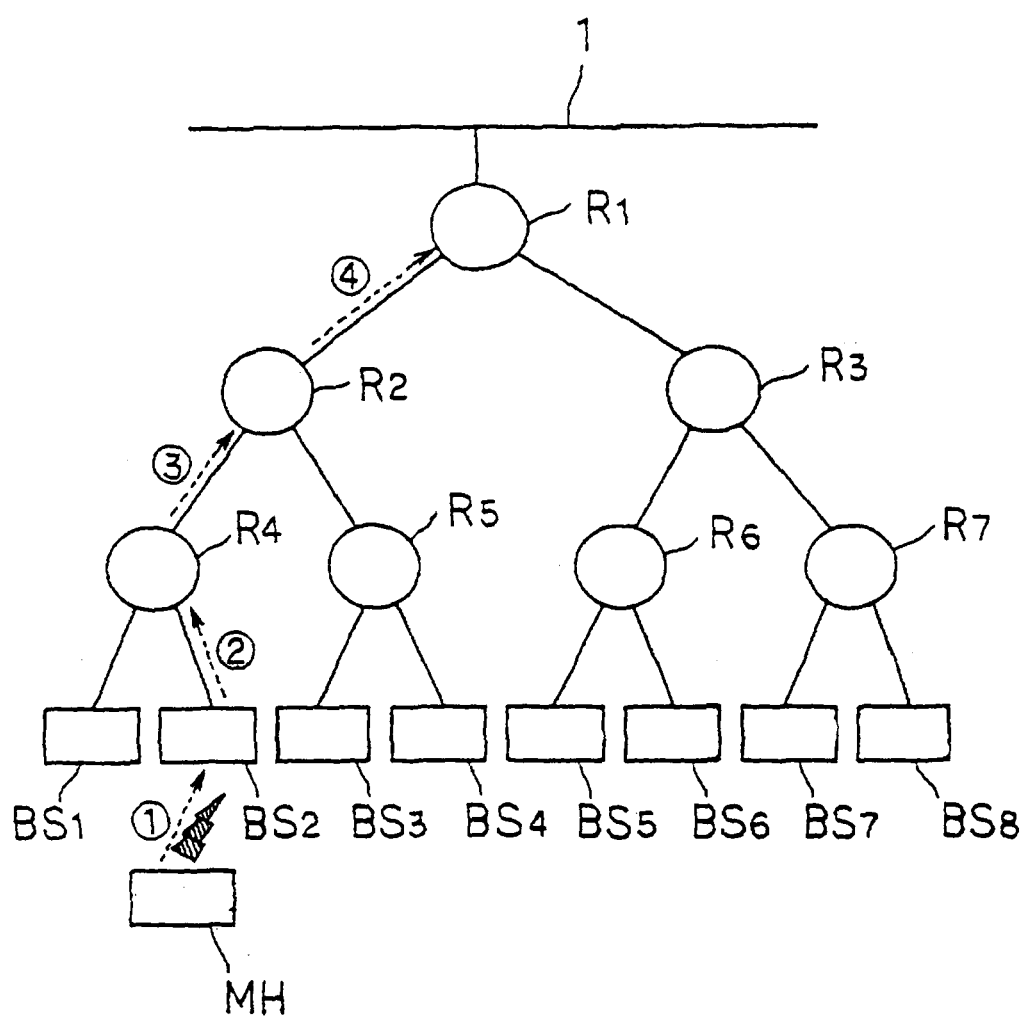
FIG. 3 is a block diagram illustrative of another conventional mobile communication network.
Figure 4:
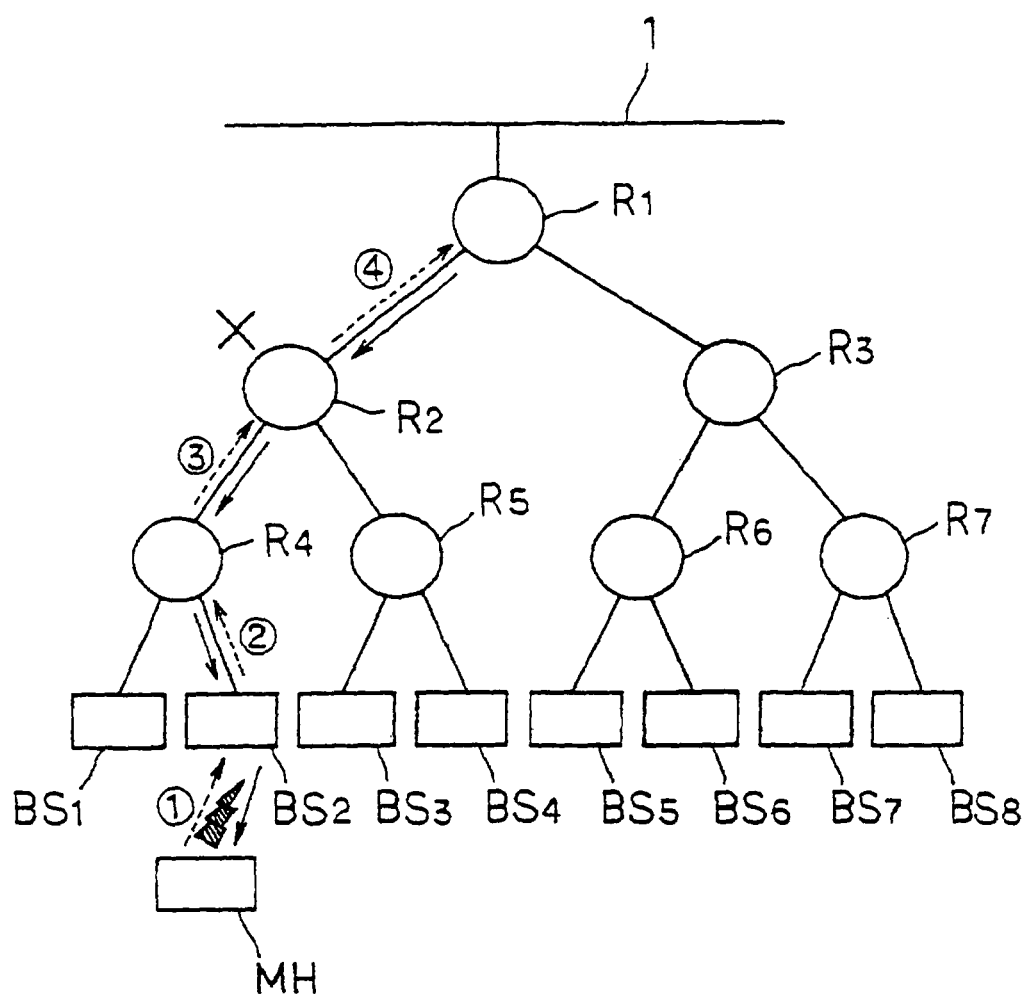
FIG. 4 is a block diagram illustrative of communication processes of the conventional mobile communication network of FIG. 3.
Figure 5:
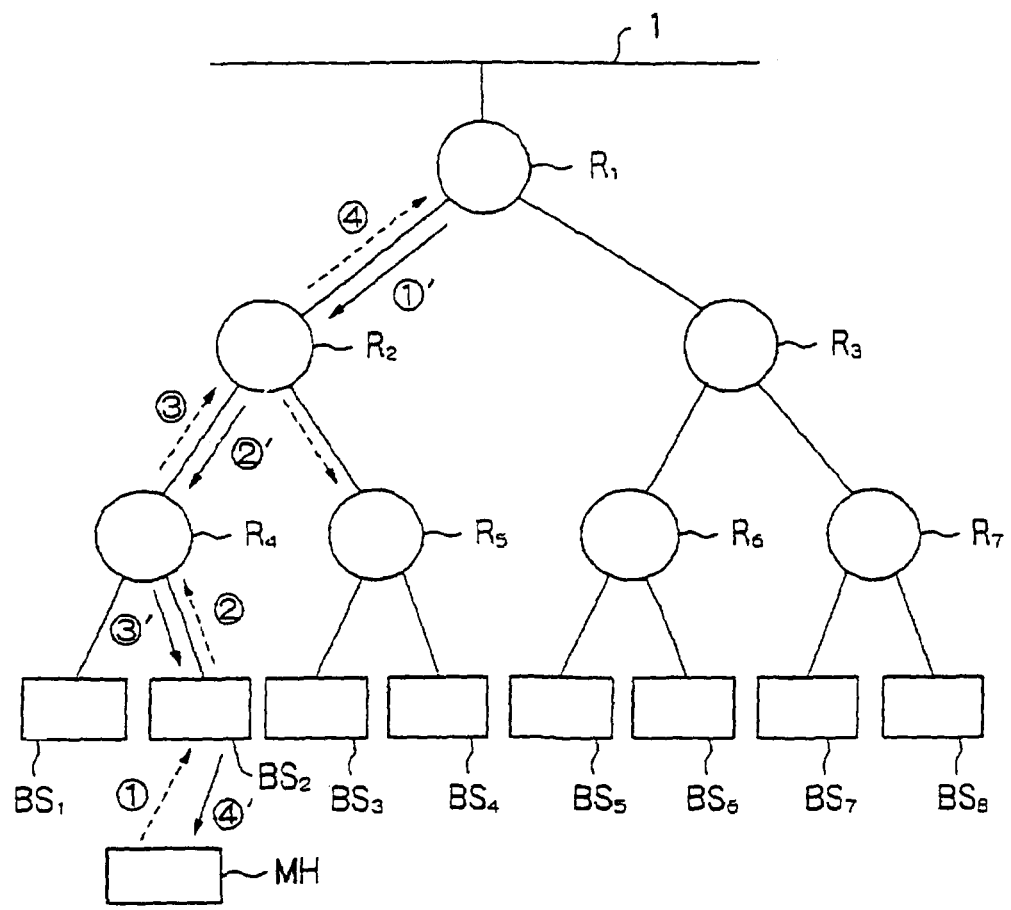
FIG. 5 is a block diagram illustrative of still another conventional mobile communication network.
Figure 6:
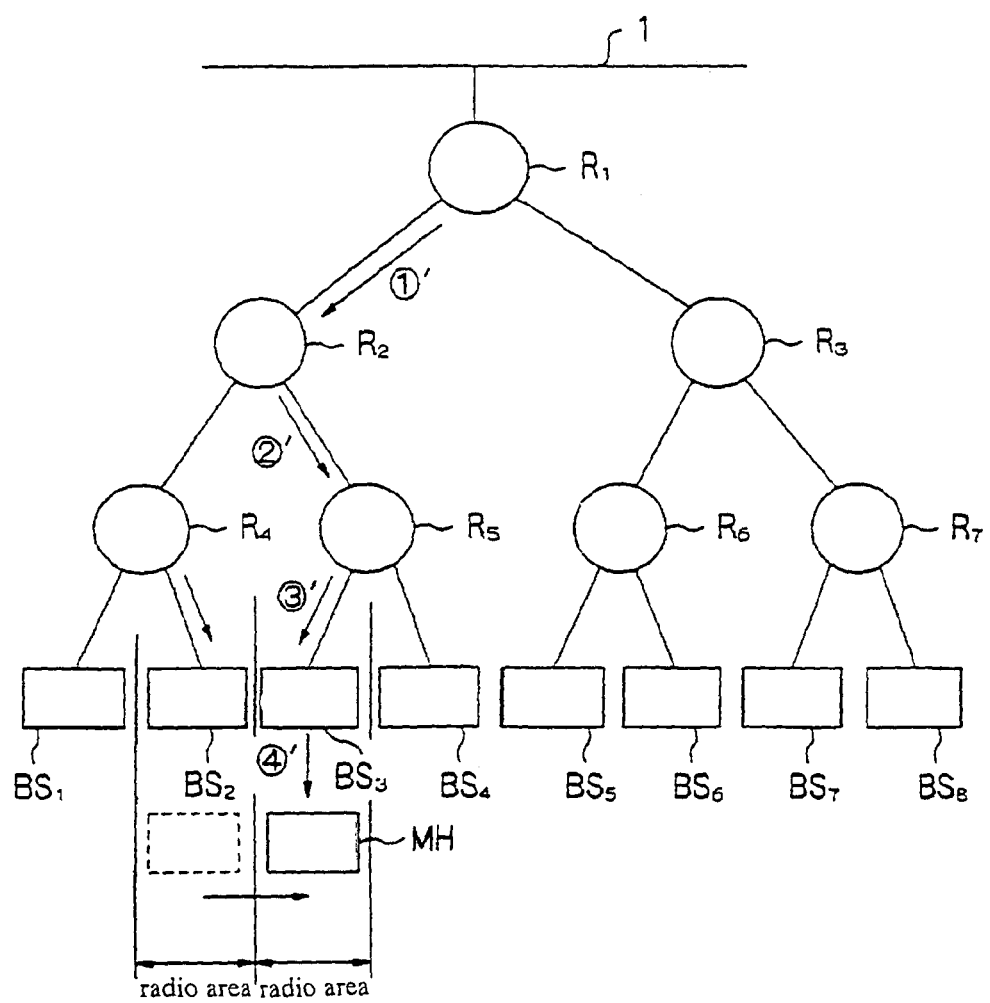
FIG. 6 is a block diagram illustrative of operation of the conventional mobile communication network of FIG. 5.

A first aspect of the present invention is a communication network comprising: a host network; a plurality of base stations; at least a mobile host capable of establishing links to the base stations; and a hierarchy-network of plural routers providing multiple-point routings between the base stations and the host network, and the routers including at least a page-area managing router for managing at least a page area for recording the mobile host, wherein the page-area managing router limits, within a predetermined number, the number of transfer-acceptable packets in packets received in a predetermined time period, so that the page-area managing router transfers only the transfer-acceptable packets to sub-ordinate routers managed by the page-area managing router, and the page-area managing router does not transfer exceeding transfer-requested packets received additionally to the transfer-acceptable packets in the predetermined time period.

It is possible that the page-area managing router discards the exceeding transfer-requested packets.

It is also possible that the page-area managing router is capable of optionally setting the predetermined number for the transfer-acceptable packets. It is also possible that the predetermined number is a natural number.

It is also possible that the page-area managing router is capable of optionally setting the predetermined time period.

It is also possible that the page-area managing router transmits, through the host network to a caller, a second packet-transmission suppression request which requests the caller to widen a time interval of discontinuous transmission of the packets.

It is also possible that the page-area managing router transmits, through the host network to a caller, a second packet-transmission suppression request which requests the caller to stop transmission of the packet until the predetermined time period has passed, and re-start the packet transmission thereafter.

A second aspect of the present invention is a method of controlling a communication network comprising: a host network; a plurality of base stations; at least a mobile host capable of establishing links to the base stations; and a hierarchy-network of plural routers providing multiple-point routings between the base stations and the host network, and the routers including at least a page-area managing router for managing at least a page area for recording the mobile host, wherein the page-area managing router limits, within a predetermined number, the number of transfer-acceptable packets in packets received in a predetermined time period, so that the page-area managing router transfers only the transfer-acceptable packets to sub-ordinate routers managed by the page-area managing router, and the page-area managing router does not transfer exceeding transfer-requested packets received additionally to the transfer-acceptable packets in the predetermined time period.

It is also possible that the page-area managing router discards the exceeding transfer-requested packets.

It is also possible that the page-area managing router is capable of optionally setting the predetermined number for the transfer-acceptable packets. It is also possible that the predetermined number is a natural number.

It is also possible that the page-area managing router is capable of optionally setting the predetermined time period.

It is also possible that the page-area managing router transmits, through the host network to a caller, a second packet-transmission suppression request which requests the caller to widen a time interval of discontinuous transmission of the packets.

It is also possible that the page-area managing router transmits, through the host network to a caller, a second packet-transmission suppression request which requests the caller to stop transmission of the packet until the predetermined time period has passed, and re-start the packet transmission thereafter.

A third aspect of the present invention is a page-area managing router included a hierarchy-network of plural routers providing multiple-point routings between a host network and plural base stations capable of links to at least a mobile host in a communication network, and the page-area managing router managing at least a page area for recording the mobile host, wherein the page-area managing router limits, within a predetermined number, the number of transfer-acceptable packets in packets received in a predetermined time period, so that the page-area managing router transfers only the transfer-acceptable packets to sub-ordinate routers managed by the page-area managing router, and the page-area managing router does not transfer exceeding transfer-requested packets received additionally to the transfer-acceptable packets in the predetermined time period.

It is also possible that the page-area managing router discards the exceeding transfer-requested packets.

It is also possible that the page-area managing router is capable of optionally setting the predetermined number for the transfer-acceptable packets. It is also possible that the predetermined number is a natural number.

It is also possible that the page-area managing router is capable of optionally setting the predetermined time period.

It is also possible that the page-area managing router transmits, through the host network to a caller, a second packet-transmission suppression request which requests the caller to widen a time interval of discontinuous transmission of the packets.

It is also possible that the page-area managing router transmits, through the host network to a caller, a second packet-transmission suppression request which requests the caller to stop transmission of the packet until the predetermined time period has passed, and re-start the packet transmission thereafter.

A fourth aspect of the present invention is a communication network comprising: a host network; a plurality of base stations; at least a mobile host capable of establishing links to the base stations; and a hierarchy-network of plural router-sets providing multiple-point routings between the base stations and the host network, wherein each of the router-sets further includes plural associated routers which provide the same communication route and which have the same routing informations, and normally selected one of the associated routers in each router set is operational to provide the communication route, and if the normally selected one of the associated routers becomes trouble or inoperational, then other of the associated routers is alternatively selected to be operational to provide the communication route, thereby allowing continuous communication between the at least mobile host and the host network.

It is also possible that the associated routers in each router set comprise a primary router and a secondary router, and the primary router is normally selected and operational to provide the communication route, and if the primary router becomes trouble or inoperational, then the secondary router is alternatively selected and operational to provide the communication route.

It is also possible that selection to one of the associated routers in each router set is made by a selected higher level router which manages the associated routers. It is also possible that originally selected one of the associated routers in each router set sends the selected higher level router a message indicating that the originally selected one of the associated routers is operational, and if the selected higher level router has not received the message from the originally selected one of the associated routers in a predetermined time period, then the selected higher level router judges that the originally selected one of the associated routers has become inoperational, and the selected higher level router selects other of the associated routers to provide the same communication route alternative to the originally selected one of the associated routers.

It is also possible that all of the associated routers update the same routing information themselves based on a position recording message of the at least mobile host which has been transferred through a selected lower level router which is managed by selected one of the associated routers, and the selected one of the associated routers further transfers the position recording message to all of higher level associated routers which are capable of managing the associated routers.

A fifth aspect of the present invention is a method of controlling a communication network comprising: a host network; a plurality of base stations; at least a mobile host capable of establishing links to the base stations; and a hierarchy-network of plural router-sets providing multiple-point routings between the base stations and the host network, each of the router-sets further including plural associated routers which provide the same communication route and which have the same routing informations, wherein normally selected one of the associated routers in each router set is operational to provide the communication route, and if the normally selected one of the associated routers becomes trouble or inoperational, then other of the associated routers is alternatively selected to be operational to provide the communication route, thereby allowing continuous communication between the at least mobile host and the host network.

It is also possible that the associated routers in each router set comprise a primary router and a secondary router, and the primary router is normally selected and operational to provide the communication route, and if the primary router becomes trouble or inoperational, then the secondary router is alternatively selected and operational to provide the communication route.

It is also possible that selection to one of the associated routers in each router set is made by a selected higher level router which manages the associated routers. It is also possible that originally selected one of the associated routers in each router set sends the selected higher level router a message indicating that the originally selected one of the associated routers is operational, and if the selected higher level router has not received the message from the originally selected one of the associated routers in a predetermined time period, then the selected higher level router judges that the originally selected one of the associated routers has become inoperational, and the selected higher level router selects other of the associated routers to provide the same communication route alternative to the originally selected one of the associated routers.

It is also possible that all of the associated routers update the same routing information themselves based on a position recording message of the at least mobile host which has been transferred through a selected lower level router which is managed by selected one of the associated routers, and the selected one of the associated routers further transfers the position recording message to all of higher level associated routers which are capable of managing the associated routers.

A sixth aspect of the present invention is a hierarchy-router-network of plural router-sets providing multiple-point routings between a plurality of base stations establishing links to at least a mobile host and a host network, wherein each of the router-sets further includes plural associated routers which provide the same communication route and which have the same routing informations, and normally selected one of the associated routers in each router set is operational to provide the communication route, and if the normally selected one of the associated routers becomes trouble or inoperational, then other of the associated routers is alternatively selected to be operational to provide the communication route, thereby allowing continuous communication between the at least mobile host and the host network.

It is also possible that the associated routers in each router set comprise a primary router and a secondary router, and the primary router is normally selected and operational to provide the communication route, and if the primary router becomes trouble or inoperational, then the secondary router is alternatively selected and operational to provide the communication route.

It is also possible that selection to one of the associated routers in each router set is made by a selected higher level router which manages the associated routers.

It is also possible that originally selected one of the associated routers in each router set sends the selected higher level router a message indicating that the originally selected one of the associated routers is operational, and if the selected higher level router has not received the message from the originally selected one of the associated routers in a predetermined time period, then the selected higher level router judges that the originally selected one of the associated routers has become inoperational, and the selected higher level router selects other of the associated routers to provide the same communication route alternative to the originally selected one of the associated routers.

It is also possible that all of the associated routers update the same routing information themselves based on a position recording message of the at least mobile host which has been transferred through a selected lower level router which is managed by selected one of the associated routers, and the selected one of the associated routers further transfers the position recording message to all of higher level associated routers which are capable of managing the associated routers.

A seventh aspect of the present invention is a communication network comprising: a host network; a plurality of base stations; at least a mobile host capable of establishing links to the base stations; and a hierarchy-network of plural routers providing multiple-point routings between the base stations and the host network, wherein at least one of the routers becomes selectively performing as a multicast router for transferring a packet to not only a first base station which has currently been linked to the mobile host but also at least a second base station adjacent to the first base station, and the second base station has currently been unlinked to the mobile host.

It is also possible that the router selected as the multicast router is positioned at a branch point of both a currently designated communication route between the host network and the first base station and a currently undesignated adjacent communication route between the host network and the second base station.

It is also possible that the selection of the multicast router is made by a retrieval to the branch point based on a position recording message from the mobile host and a last-updated routing information stored on a routing table of each of the routers, wherein the routing information is updated based on the position recording message from the mobile host. It is also possible that the retrieval to the branch point is made, every when the mobile host moves to an adjacent radio area to the last-existed radio area, based on a new position recording message from the mobile host and a newly-updated routing information.

It is also possible that the router selected as the multicast router has a lowest level in the hierarchy-network of plural routers and is positioned on a currently designated communication route between the host network and the first base station. It is also possible that the multicast router transfers the packet to the first base station and also to the second base station through a higher level router which is higher in level of the hierarchy-network of plural routers, provided that the higher level router is positioned at a branch point of both the currently designated communication route between the host network and the first base station and a currently undesignated adjacent communication route between the host network and the second base station.

It is also possible that the second base station is selected to be a base station which transmits a most intensive radio wave to the mobile host except for the first base station.

It is also possible that the multicast router adds the packet with a label value which indicates a sequence in transmission of the packet before transferring the packet with the label value. It is also possible that lowest level routers at the lowest level of the hierarchy-network of plural routers are capable of queuing the packet. It is also possible that after the mobile host entered into the adjacent radio area and established a new link to the second base station, then the mobile host sends the second base station the label value which had been last-received from the first base station, and the second base station transfers the label value to the lowest level router, and the lowest level router selects at least one packet from queuing packets by comparing respective label values of the queuing packets with reference to the last label value, and the lowest level router sends the selected at least one packet of the packets to the mobile host through the second base station.

It is also possible that the mobile host compares a just-received label value of the packet just received from the second base station to the last-received label value, and if the just-received label value is identical with the last-received label value, then the mobile host discards the packet just received from the second base station.

It is also possible that the second base station queues the packet. It is also possible that after the mobile host entered into the adjacent radio area and established a new link to the second base station, then the mobile host sends the second base station the label value which had been last-received from the first base station, and the second base station selects at least one packet from queuing packets by comparing respective label values of the queuing packets with reference to the last label value, and the second base station sends the selected at least one packet to the mobile host.

It is also possible that the multicast router is a bicast router.

An eighth aspect of the present invention is a communication network comprising: a host network; a plurality of base stations; at least a mobile host capable of establishing links to the base stations; and a hierarchy-network of plural routers providing multiple-point routings between the base stations and the host network, wherein the hierarchy-network of plural routers establishes not only a currently designated communication route between the host network and a first base station which has currently been linked to the mobile host but also a currently undesignated adjacent communication route between the host network and a second base station adjacent to the first base station, and the second base station has currently been unlinked to the mobile host, and wherein the hierarchy-network of plural routers transfers a packet not only through the currently designated communication route to the first base station but also through the currently undesignated adjacent communication route to the second base station.

It is also possible that a router positioned at a branch point of both the currently designated communication route and the currently undesignated adjacent communication route is selected to perform as a multicast router. It is also possible that the selection of the multicast router is made by a retrieval to the branch point based on a position recording message from the mobile host and a last-updated routing information stored on a routing table of each of the routers, wherein the routing information is updated based on the position recording message from the mobile host. It is also possible that the retrieval to the branch point is made, every when the mobile host moves to an adjacent radio area to the last-existed radio area, based on a new position recording message from the mobile host and a newly-updated routing information.

It is also possible that the router selected as the multicast router has a lowest level in the hierarchy-network of plural routers and is positioned on a currently designated communication route between the host network and the first base station. It is also possible that the multicast router transfers the packet to the first base station and also to the second base station through a higher level router which is higher in level of the hierarchy-network of plural routers, provided that the higher level router is positioned at a branch point of both the currently designated communication route between the host network and the first base station and a currently undesignated adjacent communication route between the host network and the second base station.

It is also possible that the second base station is selected to be a base station which transmits a most intensive radio wave to the mobile host except for the first base station.

It is also possible that the multicast router adds the packet with a label value which indicates a sequence in transmission of the packet before transferring the packet with the label value. It is also possible that lowest level routers at the lowest level of the hierarchy-network of plural routers are capable of queuing the packet. It is also possible that after the mobile host entered into the adjacent radio area and established a new link to the second base station, then the mobile host sends the second base station the label value which had been last-received from the first base station, and the second base station transfers the label value to the lowest level router, and the lowest level router selects at least one packet from queuing packets by comparing respective label values of the queuing packets with reference to the last label value, and the lowest level router sends the selected at least one packet of the packets to the mobile host through the second base station.

It is also possible that the mobile host compares a just-received label value of the packet just received from the second base station to the last-received label value, and if the just-received label value is identical with the last-received label value, then the mobile host discards the packet just received from the second base station.

It is also possible that the second base station queues the packet. It is also possible that after the mobile host entered into the adjacent radio area and established a new link to the second base station, then the mobile host sends the second base station the label value which had been last-received from the first base station, and the second base station selects at least one packet from queuing packets by comparing respective label values of the queuing packets with reference to the last label value, and the second base station sends the selected at least one packet to the mobile host.

It is also possible that the multicast router is a bicast router.

A ninth aspect of the present invention is a method of controlling a communication network comprising: a host network; a plurality of base stations; at least a mobile host capable of establishing links to the base stations and a hierarchy-network of plural routers providing multiple-point routings between the base stations and the host network, wherein at least one of the routers becomes selectively performing as a multicast router for transferring a packet to not only a first base station which has currently been linked to the mobile host but also at least a second base station adjacent to the first base station, and the second base station has currently been unlinked to the mobile host.

It is also possible that the router selected as the multicast router is positioned at a branch point of both a currently designated communication route between the host network and the first base station and a currently undesignated adjacent communication route between the host network and the second base station. It is also possible that the selection of the multicast router is made by a retrieval to the branch point based on a position recording message from the mobile host and a last-updated routing information stored on a routing table of each of the routers, wherein the routing information is updated based on the position recording message from the mobile host. It is also possible that the retrieval to the branch point is made, every when the mobile host moves to an adjacent radio area to the last-existed radio area, based on a new position recording message from the mobile host and a newly-updated routing information.

It is also possible that the router selected as the multicast router has a lowest level in the hierarchy-network of plural routers and is positioned on a currently designated communication route between the host network and the first base station. It is also possible that the multicast router transfers the packet to the first base station and also to the second base station through a higher level router which is higher in level of the hierarchy-network of plural routers, provided that the higher level router is positioned at a branch point of both the currently designated communication route between the host network and the first base station and a currently undesignated adjacent communication route between the host network and the second base station.

It is also possible that the second base station is selected to be a base station which transmits a most intensive radio wave to the mobile host except for the first base station.

It is also possible that the multicast router adds the packet with a label value which indicates a sequence in transmission of the packet before transferring the packet with the label value. It is also possible that lowest level routers at the lowest level of the hierarchy-network of plural routers are capable of queuing the packet. It is also possible that after the mobile host entered into the adjacent radio area and established a new link to the second base station, then the mobile host sends the second base station the label value which had been last-received from the first base station, and the second base station transfers the label value to the lowest level router, and the lowest level router selects at least one packet from queuing packets by comparing respective label values of the queuing packets with reference to the last label value, and the lowest level router sends the selected at least one packet of the packets to the mobile host through the second base station.

It is also possible that the mobile host compares a just-received label value of the packet just received from the second base station to the last-received label value, and if the just-received label value is identical with the last-received label value, then the mobile host discards the packet just received from the second base station.

It is also possible that the second base station queues the packet. It is also possible that after the mobile host entered into the adjacent radio area and established a new link to the second base station, then the mobile host sends the second base station the label value which had been last-received from the first base station, and the second base station selects at least one packet from queuing packets by comparing respective label values of the queuing packets with reference to the last label value, and the second base station sends the selected at least one packet to the mobile host.

It is also possible that the multicast router is a bicast router.

A tenth aspect of the present invention is a method of controlling a communication network comprising: a host network; a plurality of base stations; at least a mobile host capable of establishing links to the base stations; and a hierarchy-network of plural routers providing multiple-point routings between the base stations and the host network, wherein the hierarchy-network of plural routers establishes not only a currently designated communication route between the host network and a first base station which has currently been linked to the mobile host but also a currently undesignated adjacent communication route between the host network and a second base station adjacent to the first base station, and the second base station has currently been unlinked to the mobile host, and wherein the hierarchy-network of plural routers transfers a packet not only through the currently designated communication route to the first base station but also through the currently undesignated adjacent communication route to the second base station.

It is also possible that a router positioned at a branch point of both the currently designated communication route and the currently undesignated adjacent communication route is selected to perform as a multicast router.

It is also possible that the selection of the multicast router is made by a retrieval to the branch point based on a position recording message from the mobile host and a last-updated routing information stored on a routing table of each of the routers, wherein the routing information is updated based on the position recording message from the mobile host. It is also possible that the retrieval to the branch point is made, every when the mobile host moves to an adjacent radio area to the last-existed radio area, based on a new position recording message from the mobile host and a newly-updated routing information. It is also possible that the router selected as the multicast router has a lowest level in the hierarchy-network of plural routers and is positioned on a currently designated communication route between the host network and the first base station. It is also possible that the multicast router transfers the packet to the first base station and also to the second base station through a higher level router which is higher in level of the hierarchy-network of plural routers, provided that the higher level router is positioned at a branch point of both the currently designated communication route between the host network and the first base station and a currently undesignated adjacent communication route between the host network and the second base station.

It is also possible that the second base station is selected to be a base station which transmits a most intensive radio wave to the mobile host except for the first base station.

It is also possible that the multicast router adds the packet with a label value which indicates a sequence in transmission of the packet before transferring the packet with the label value. It is also possible that lowest level routers at the lowest level of the hierarchy-network of plural routers are capable of queuing the packet. It is also possible that after the mobile host entered into the adjacent radio area and established a new link to the second base station, then the mobile host sends the second base station the label value which had been last-received from the first base station, and the second base station transfers the label value to the lowest level router, and the lowest level router selects at least one packet from queuing packets by comparing respective label values of the queuing packets with reference to the last label value, and the lowest level router sends the selected at least one packet of the packets to the mobile host through the second base station.

It is also possible that the mobile host compares a just-received label value of the packet just received from the second base station to the last-received label value, and if the just-received label value is identical with the last-received label value, then the mobile host discards the packet just received from the second base station.

It is also possible that the second base station queues the packet. It is also possible that after the mobile host entered into the adjacent radio area and established a new link to the second base station, then the mobile host sends the second base station the label value which had been last-received from the first base station, and the second base station selects at least one packet from queuing packets by comparing respective label values of the queuing packets with reference to the last label value, and the second base station sends the selected at least one packet to the mobile host.

It is also possible that the multicast router is a bicast router.

First Embodiment

Figure 7:
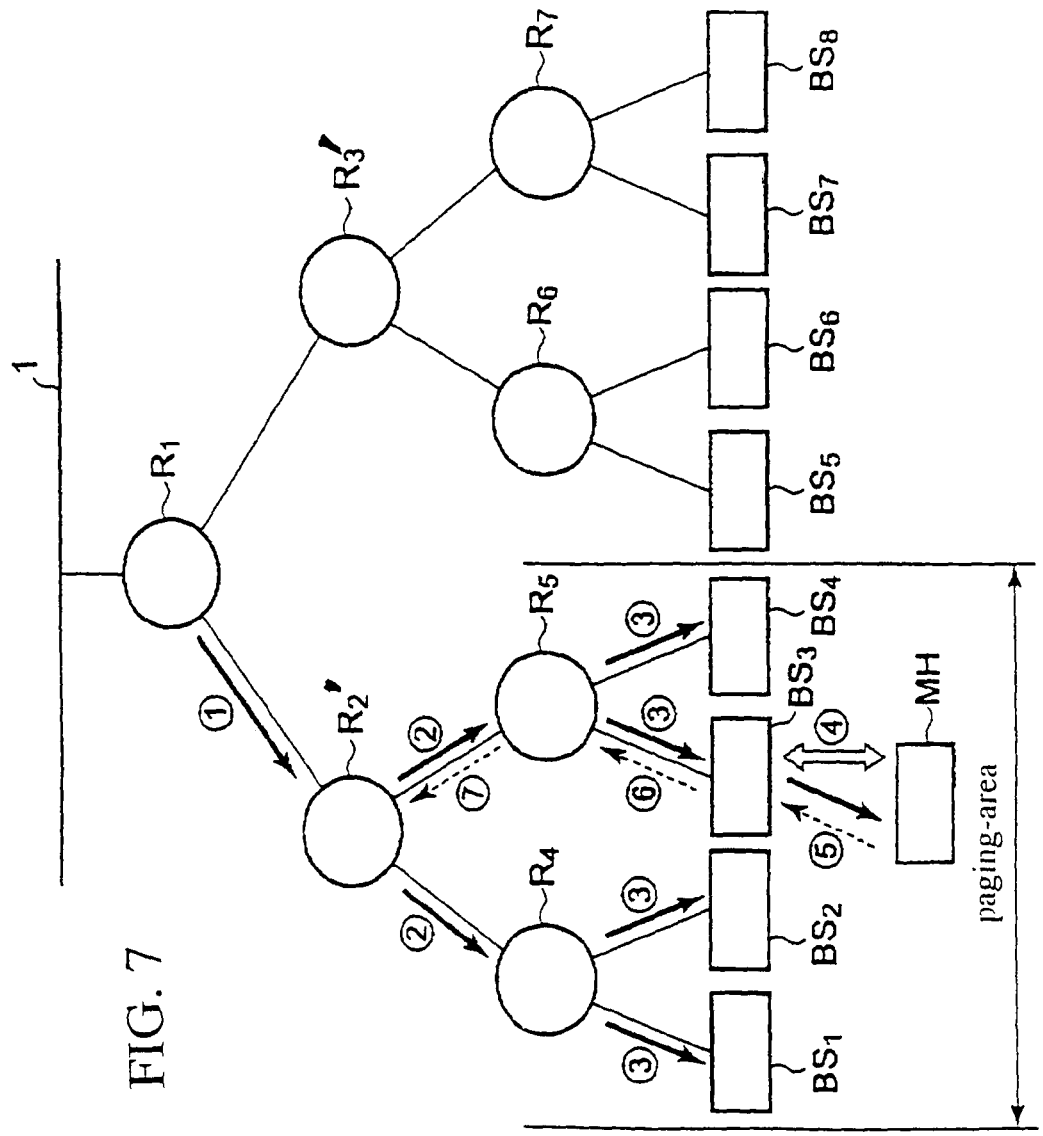
FIG. 7 is a block diagram illustrative of a novel mobile communication network in a first embodiment in accordance with the present invention.

A first embodiment according to the present invention will be described in detail with reference to the drawings. FIG. 7 is a block diagram illustrative of a novel mobile communication network in a first embodiment in accordance with the present invention. This mobile communication network is generally used for a management system for managing positions of mobile telephones or automatic cars. This mobile communication network utilizes transmission control protocol/internet protocol (TCP/IP) for realizing a packet communication.

As shown in FIG. 7, the mobile communication network includes a host network 1, plural routers Rn (n=1~7), base stations BS1~BS8, and a mobile host MH. The host network 1 may comprise a wide area network such as internet. The routers Rn provide multi-point connections between the host network 1 and the base stations BS1~BS8. The routers Rn form a hierarchical network structure between the host network 1 and the base stations BS1~BS8. The router R1 is highest level router. The routers R2' and R3' are middle level routers which are connected to the router R1 and dominated by the router R1. The routers R4, R5, R6 and R7 are lowest level routers, wherein the routers R4 and R5 are connected to the router R2' and dominated by the router R2', whilst the routers R6 and R7 are connected to the router R3' and dominated by the router R3'. The base stations BS1 and BS2 are connected to the router R4 and dominated by the router R4. The base stations BS3 and BS4 are connected to the router R5 and dominated by the router R5. The base stations BS5 and BS6 are connected to the router R6 and dominated by the router R6. The base stations BS7 and BS8 are connected to the router R7 and dominated by the router R7.

The mobile host MH is connected through radio communication to any one of the base stations BS1~BS8 to establish a link to the base station for communication through the host network 1 to other subscriber.

In accordance with this mobile communication network, the mobile host MH is managed in the current position thereof in activated state, or the mobile host MH is managed in paging area in inactivated state o stand-by state.

The routers R2' and R3' manage the respective paging areas. In FIG. 7, the mobile host MH is positioned in an area covered by the base stations BS1, BS2, BS3 and BS4, for which reason the mobile host MH is recorded in the paging area dominated by the router R2'. If the mobile host MH moves from the first paging area dominated by the base stations BS1, BS2, BS3 and BS4 which are further dominated by the router R2' into a second paging area dominated by the base stations BS5, BS6, BS7 and BS8 which are further dominated by the router R3', then the router R3' registers the mobile host MH in the second paging area in accordance with a position recording message from the mobile host MH.

The routers R2' and R3' are adjusted to reduce the load to the sub-ordinate network managed by the routers R2' and R3' in the general calling process if the package addressed to the mobile host MH is in the stand-by state is received. Each of the routers R2' and R3' has a limiting function for limiting the number of transfer-requested packets in a predetermined time period "T" within a predetermined number, for example, 1, wherein the transfer-requested packets are the packets requested to be transferred to the sub-ordinate routers R4, R5, R6 and R7.

If the number of the transfer-requested packets received by each of the routers R2' and R3' in the predetermined time period "T" is within the predetermined number, then each of the routers R2' and R3' normally transfers the received packet to the sub-ordinate routers R4, R5, R6 and R7. If, however, the number of the transfer-requested packets received by each of the routers R2' and R3' in the predetermined time period "T" exceeds the predetermined number, then each of the routers R2' and R3' transfers transfer-acceptable packets of the predetermined number to the sub-ordinate routers R4, R5, R6 and R7, and discard exceeding transfer-requested packets in addition to the transfer-acceptable packets. The transfer-acceptable packets are the packets of the predetermined number, whilst the exceeding transfer-requested packets are the packets of the exceeding number over the predetermined number.

If the predetermined number is set 1, then first one of the received packets corresponds to the transfer-acceptable packet, and any further ones of the packets received in the predetermined time period correspond to the exceeding transfer-requested packets, for which reason each of the routers R2' and R3' transfers only the first one packet as the transfer-acceptable packet and discard the further packets received in the predetermined time period as the exceeding transfer-requested packets.

Figure 8:
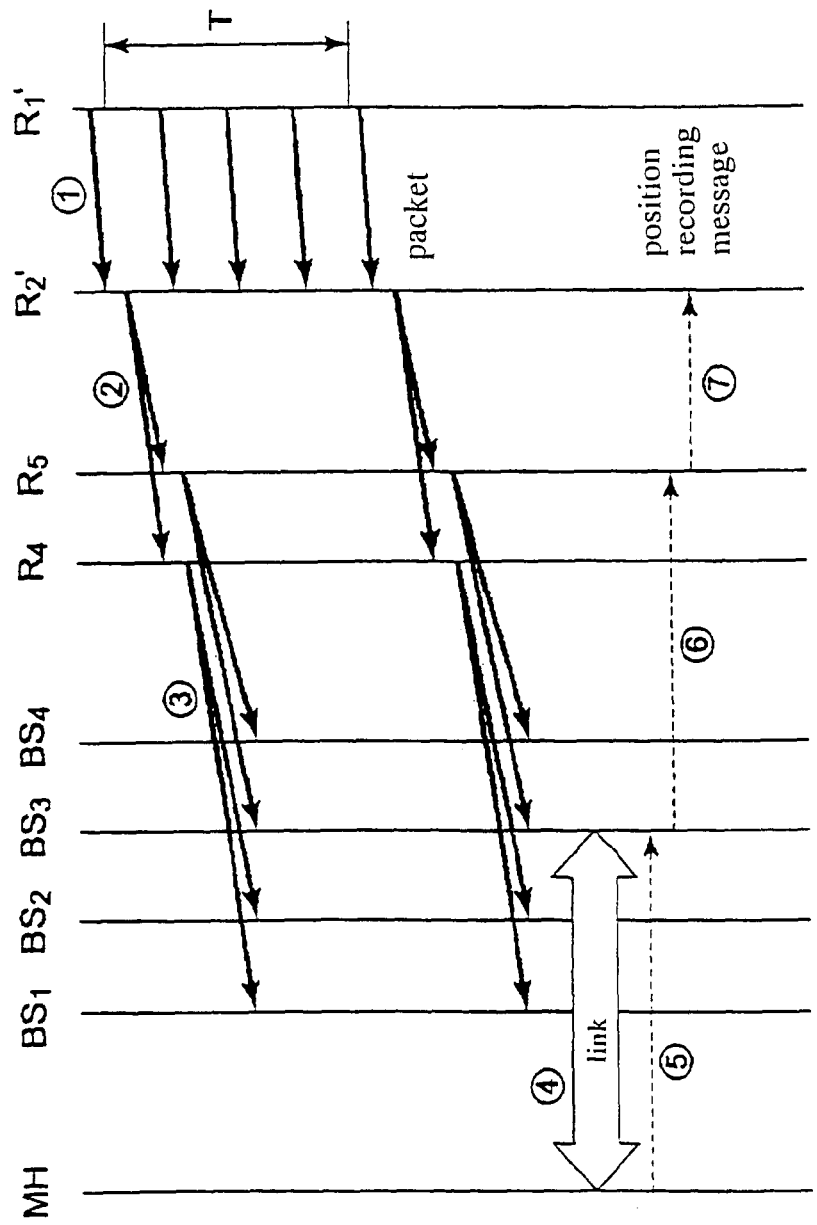
FIG. 8 is a sequence diagram illustrative of sequential operations of the above described novel mobile communication hierarchical network shown in FIG. 7.

FIG. 8 is a sequence diagram illustrative of sequential operations of the above described novel mobile communication hierarchical network shown in FIG. 7. As shown in FIG. 8, the router R2' receives four packets, for example, a first-received packet, a second-received packet, a third-received packet, and a fourth-received packet in the predetermined time period "T". The predetermined number for the transfer-acceptable packet is set 1 in the router R2'. The router R2' transfers only the first-received packet to the routers R4 and R5 and discard the remaining second-received, third-received and fourth-received packets without transfer. As a result, in the predetermined time period "T", no link can be established between the base station BS3 and the mobile host MH.

After the predetermined time period "T" has passed, then the router R2 becomes able to transfer but only one packet in the next predetermined time period "T". As shown in FIG. 8, the second-transfer of the packet from the router R2' to the routers R4 and R5 results in the establishment between the base station BS3 and the mobile host MH.

As described above, in accordance with the novel mobile communication hierarchical network, the routers R2' and R3' for managing the respective paging areas for recording the mobile host MH are improved to reduce or control a packet traffic in the predetermined time period in the sub-ordinate network managed by the routers R2' and R3', whereby the improved routers R2' and R3' reduce the load to the mobile communication hierarchical network.

The above-described predetermined time period "T", the throughput of the network and the predetermined number for the transfer-acceptable packets may optionally be decided. The number of hierarchy of the routers in the mobile communication network, the number of the base stations BS, and the number of the mobile host MH may be optional.

The following modification to the first embodiment is optionally possible. If the number of the transfer-requested packets received by each of the routers R2' and R3' in the predetermined time period "T" exceeds the predetermined number, then each of the routers R2' and R3' further sends the caller of a packet-transmission suppression request which requests the caller to widen the time interval of discontinuous transmission of the packets or which requests the caller to stop the transmission of the packet until the predetermined time period "T" has passed, and re-start the packet transmission thereafter.

If, for example, the predetermined number is set 1, then after the router R2' received the first-received packet, then the router R2' sends the caller of a packet-transmission suppression request which requests the caller to widen the time interval of discontinuous transmission of the packets or which requests the caller to stop the transmission of the packet until the predetermined time period "T" has passed, and re-start the packet transmission thereafter.

Second Embodiment

Figure 9:
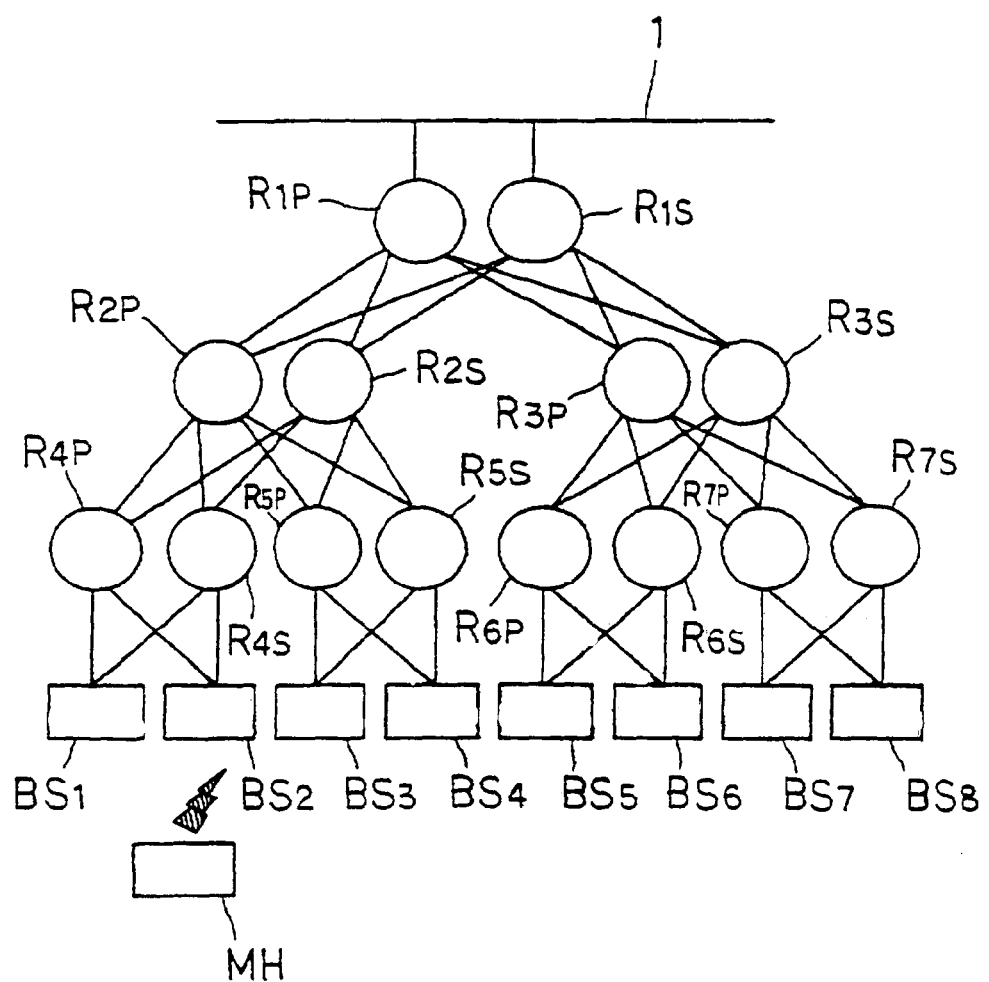
FIG. 9 is a block diagram illustrative of a novel mobile communication network in a second embodiment in accordance with the present invention.

A second embodiment according to the present invention will be described in detail with reference to the drawings. FIG. 9 is a block diagram illustrative of a novel mobile communication network in a second embodiment in accordance with the present invention. This mobile communication network is generally used for a management system for managing positions of mobile telephones or automatic cars. This mobile communication network utilizes transmission control protocol/internet protocol (TCP/IP) for realizing a packet communication.

As shown in FIG. 9, the mobile communication network includes a host network 1, plural pairs of primary routers Rnp (n=1~7) and secondary routers Rns (n=1~7), base stations BS1~BS8, and a mobile host MH. The host network 1 may comprise a wide area network such as internet. The plural pairs of primary routers Rnp (n=1~7) and secondary routers Rns (n=1~7) provide multi-point connections between the host network 1 and the base stations BS1~BS8. The plural pairs of primary routers Rnp (n=1~7) and secondary routers Rns (n=1~7) form a hierarchical network structure between the host network 1 and the base stations BS1~BS8.

The primary router R1$p$ and the secondary router R1$s$ make a first pair providing a first point at highest level of the hierarchical routes. The primary router R1$p$ and the secondary router R1$s$ provide the same route and have the same routing information.

The primary router R2$p$ and the secondary router R2$s$ make a second pair providing a second point at middle level of the hierarchical routes. The primary router R2$p$ and the secondary router R2$s$ provide the same route and have the same routing information. The primary router R2$p$ is connected to both the primary router R1$p$ and the secondary router R1$s$ in parallel, so that the primary router R2$p$ is managed by each of the primary router R1$p$ and the secondary router R1$s$. The secondary router R2$s$ is also connected to both the primary router R1$p$ and the secondary router R1$s$ in parallel, so that the secondary router R2$s$ is managed by each of the primary router R1$p$ and the secondary router R1$s$. The primary router R2$p$ and the secondary router R2$s$ have the same connection routes to the primary router R1$p$ and the secondary router R1$s$.

The primary router R3$p$ and the secondary router R3$s$ make a third pair providing a third point at middle level of the hierarchical routes. The primary router R3$p$ and the secondary router R3$s$ provide the same route and have the same routing information. The primary router R3$p$ is connected to both the primary router R1$p$ and the secondary router R1$s$ in parallel, so that the primary router R3$p$ is managed by each of the primary router R1$p$ and the secondary router R1$s$. The secondary router R3s is also connected to both the primary router R1p and the secondary router R1s in parallel, so that the secondary router R3s is managed by each of the primary router R1p and the secondary router R1s. The primary router R3p and the secondary router R3s have the same connection routes to the primary router R1p and the secondary router R1s.

The primary router R1p is connected to the primary router R2p and the secondary router R2s as well as connected to the primary router R3p and the secondary router R3s for managing the primary router R2p and the secondary router R2s as well as the primary router R3p and the secondary router R3s. The secondary router R2s is also connected to the primary router R2p and the secondary router R2s as well as connected to the primary router R3p and the secondary router R3s for managing the primary router R2p and the secondary router R2s as well as the primary router R3p and the secondary router R3s.

The primary router R4p and the secondary router R4s make a fourth pair providing a fourth point at lowest level of the hierarchical routes. The primary router R4p and the secondary router R4s provide the same route and have the same routing information. The primary router R4p is connected to both the primary router R2p and the secondary router R2s in parallel, so that the primary router R4p is managed by each of the primary router R2p and the secondary router R2s. The secondary router R4s is also connected to both the primary router R2p and the secondary router R2s in parallel, so that the secondary router R4s is managed by each of the primary router R2p and the secondary router R2s. The primary router R4p and the secondary router R4s have the same connection routes to the primary router R2p and the secondary router R2s. The primary router R4p is further connected to the base stations BS1 and BS2 in parallel for managing the base stations BS1 and BS2. The secondary router R4s is also connected to the base stations. BS1 and BS2 in parallel for managing the base stations BS1 and BS2. The primary router R4p and the secondary router R4s have the same connection routes to the base stations BS1 and BS2.

The primary router R5p and the secondary router R5s make a fifth pair providing a fifth point at lowest level of the hierarchical routes. The primary router R5p and the secondary router R5s provide the same route and have the same routing information. The primary router R5p is connected to both the primary router R2p and the secondary router R2s in parallel, so that the primary router R5p is managed by each of the primary router R2p and the secondary router R2s. The secondary router R5s is also connected to both the primary router R2p and the secondary router R2s in parallel, so that the secondary router R5s is managed by each of the primary router R2p and the secondary router R2s. The primary router R5p and the secondary router R5s have the same connection routes to the primary router R2p and the secondary router R2s. The primary router R5p is further connected to the base stations BS3 and BS4 in parallel for managing the base stations BS3 and BS4. The secondary router R5s is also connected to the base stations BS3 and BS4 in parallel for managing the base stations BS3 and BS4. The primary router R5p and the secondary router R5s have the same connection routes to the base stations BS3 and BS4.

The primary router R2p is connected to the primary router R4p and the secondary router R4s as well as connected to the primary router R5p and the secondary router R5s for managing the primary router R4p and the secondary router R4s as well as the primary router R5p and the secondary router R5s. The secondary router R2s is also connected to the primary router R4p and the secondary router R4s as well as connected to the primary router R5p and the secondary router R5s for managing the primary router R4p and the secondary router R4s as well as the primary router R5p and the secondary router R5s.

The primary router R6p and the secondary router R6s make a sixth pair providing a sixth point at lowest level of the hierarchical routes. The primary router R6p and the secondary router R6s provide the same route and have the same routing information. The primary router R6p is connected to both the primary router R3p and the secondary router R3s in parallel, so that the primary router R6p is managed by each of the primary router R3p and the secondary router R3s. The secondary router R6s is also connected to both the primary router R3p and the secondary router R3s in parallel, so that the secondary router R6s is managed by each of the primary router R3p and the secondary router R3s. The primary router R6p and the secondary router R6s have the same connection routes to the primary router R3p and the secondary router R3s. The primary router R6p is further connected to the base stations BS5 and BS6 in parallel for managing the base stations BS5 and BS6. The secondary router R6s is also connected to the base stations BS5 and BS6 in parallel for managing the base stations BS5 and BS6. The primary router R6p and the secondary router R6s have the same connection routes to the base stations BS5 and BS6.

The primary router R7p and the secondary router R7s make a seventh pair providing a seventh point at lowest level of the hierarchical routes. The primary router R7p and the secondary router R7s provide the same route and have the same routing information. The primary router R7p is connected to both the primary router R3p and the secondary router R3s in parallel, so that the primary router R7p is managed by each of the primary router R3p and the secondary router R3s. The secondary router R7s is also connected to both the primary router R3p and the secondary router R3s in parallel, so that the secondary router R7s is managed by each of the primary router R3p and the secondary router R3s. The primary router R7p and the secondary router R7s have the same connection routes to the primary router R3p and the secondary router R3s. The primary router R7p is further connected to the base stations BS7 and BS8 in parallel for managing the base stations BS7 and BS8. The secondary router R7s is also connected to the base stations BS7 and BS8 in parallel for managing the base stations BS7 and BS8. The primary router R7p and the secondary router R7s have the same connection routes to the base stations BS7 and BS8.

The primary router R3p is connected to the primary router R6p and the secondary router R6s as well as connected to the primary router R7p and the secondary router R7s for managing the primary router R6p and the secondary router R6s as well as the primary router R7p and the secondary router R7s. The secondary router R3s is also connected to the primary router R6p and the secondary router R6s as well as connected to the primary router R7p and the secondary router R7s for managing the primary router R6p and the secondary router R6s as well as the primary router R7p and the secondary router R7s. Each of the base stations BS1, BS2, BS3, BS4, BS5, BS6, BS7 and BS8 is capable of establishing the link to the mobile host MH.

As described above, the primary set of the primary routers Rnp and the secondary set of the secondary routers Rns provide the same hierarchical routes between the host network 1 and the base stations BS1, BS2, BS3, BS4, BS5, BS6, BS7 and BS8. The reason why the secondary routers Rns are additionally provided to the primary routers Rnp are as follows. In normal, the primary set of the primary routers Rnp is used to provide the hierarchical routes between the host network 1 and the base stations BS1, BS2, BS3, BS4, BS5, BS6, BS7 and BS8 for implementation of the communication through the mobile communication hierarchical network. If the primary router Rnp becomes trouble, then the paired secondary router Rns making the pair with the troubled primary router Rnp is selected and used alternative to the troubled primary router Rnp. The secondary router Rns has the same routing information and provides the same route as the troubled primary router Rnp, for which reason the same communication route can be maintained.

If at least any one of the primary routers Rnp on the established communication route becomes once trouble and the communication route becomes lost, then the paired secondary router Rns making the pair with the troubled primary router Rnp is selected and used alternative to the troubled primary router Rnp, whereby the secondary router Rns provides the same communication route for allowing continuation of the current communication between the mobile host MH and the host network 1.

Figure 10:
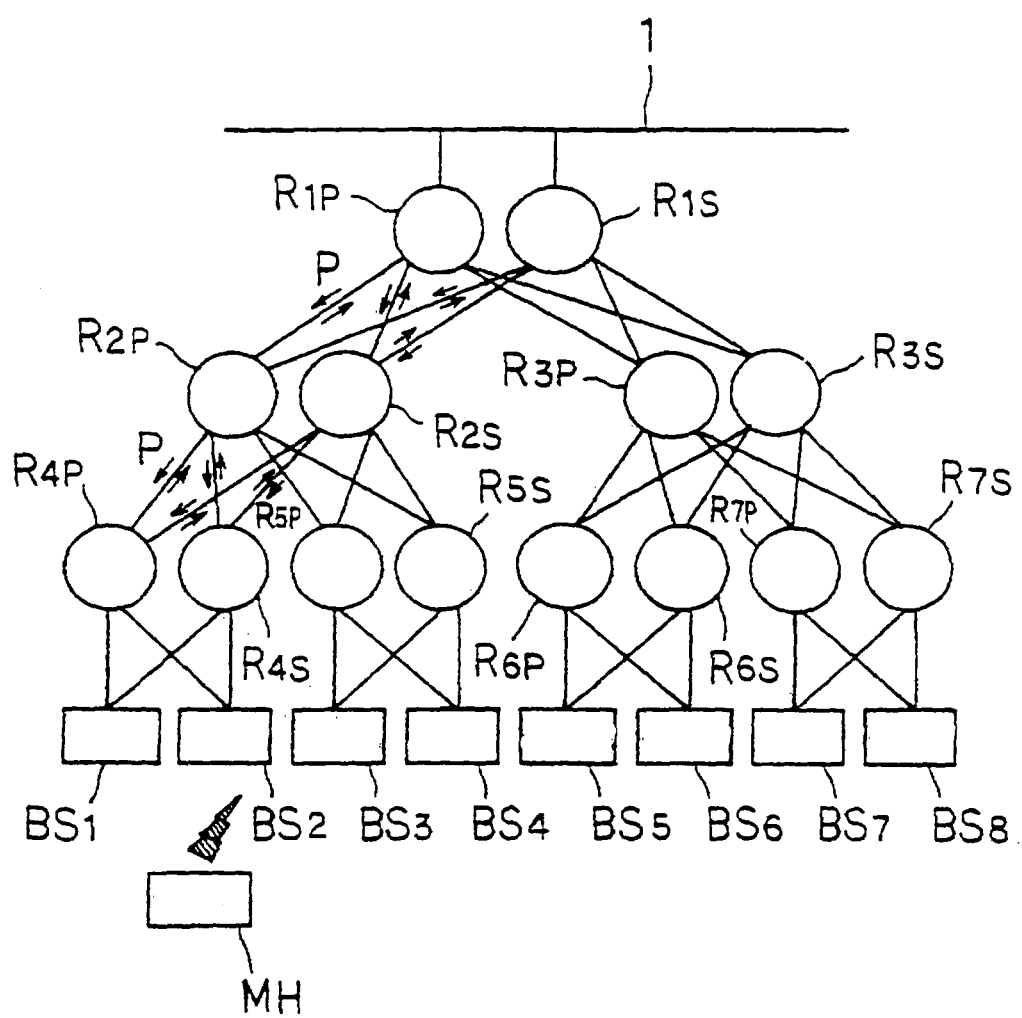
FIG. 10 is a block diagram illustrative of operations of the novel mobile communication network of FIG. 9.

FIG. 10 is a block diagram illustrative of operations of the novel mobile communication network of FIG. 9. A communication route has been established between the first pair of the primary router R1p and the secondary router R1s and the fourth pair of the primary router R4p and the secondary router R4s through the second pair of the primary router R2p and the secondary router R2s.

The primary router R2p and the secondary router R2s are sub-ordinate routers to the primary router R1p and the secondary router R1s, so that the primary router R2p and the secondary router R2s are managed by the primary router R1p and the secondary router R1s. Each of the primary router R2p and the secondary router R2s periodically sends informations of whether the router function is effective or ineffective to each of the primary router R1p and the secondary router R1s, so that the primary router R1p and the secondary router R1s can periodically manage that the functions of the primary router R2p and the secondary router R2s would be currently effective.

The primary router R4p and the secondary router R4s are sub-ordinate routers to the primary router R2p and the secondary router R2s, so that the primary router R4p and the secondary router R4s are managed by the primary router R2p and the secondary router R2s. Each of the primary router R4p and the secondary router R4s periodically sends informations of whether the router function is effective or ineffective to each of the primary router R2p and the secondary router R2s, so that the primary router R2p and the secondary router R2s can periodically manage that the functions of the primary router R4p and the secondary router R4s would be currently effective.

The primary router R1p and the secondary router R1s are manager routers to the primary router R2p and the secondary router R2s, so that the primary router R1p and the secondary router R1s manage the primary router R2p and the secondary router R2s. Each of the primary router R1p and the secondary router R1s periodically sends the following respective informations to each of the primary router R2p and the secondary router R2s. The respective informations from the primary router R1p and the secondary router R1s to the primary router R2p and the secondary router R2s include respective primary flags which separately indicate that the primary router R2p should be selected or not and that the secondary router R2s should be selected or not. If the primary flag is ON, this means that the router be selected. If the primary flag is OFF, this means that the router be unselected.

The primary router R2p and the secondary router R2s are manager routers to the primary router R4p and the secondary router R4s, so that the primary router R2p and the secondary router R2s manage the primary router R4p and the secondary router R4s. Each of the primary router R2p and the secondary router R2s periodically sends the following respective informations to each of the primary router R4p and the secondary router R4s. The respective informations from the primary router R1p and the secondary router R1s to the primary router R2p and the secondary router R2s include respective primary flags which separately indicate that the primary router R2p should be selected or not and that the secondary router R2s should be selected or not. If the primary flag is ON, this means that the router be selected. If the primary flag is OFF, this means that the router be unselected.

For example, the primary router R1p periodically sends the primary router R2p the information that the primary flag is ON, whereby the primary router R2p is selected to provide the communication route. The primary router R1p also periodically sends the secondary router R2s the information that the primary flag is OFF, whereby the secondary router R2s is unselected to provide no communication route. The selected primary router R2p further periodically sends the primary router R4p the information that the primary flag is ON, whereby the primary router R4p is selected to provide the communication route. The selected primary router R2p further periodically sends the secondary router R4s the information that the primary flag is OFF, whereby the secondary router R4s is unselected to provide no communication route. The unselected secondary router R2s periodically sends the primary router R4s and the secondary router R4s the information that the primary flag is OFF. The unselected secondary router R1s periodically sends the primary router R2s and the secondary router R2s the information that the primary flag is OFF.

The informations including the primary flag are transmitted between the upper level routers and the lower level routers for selecting the routers which provide the communication route between the host network 1 and the base stations BS, whereby the available communication route can be established based on the informations including the primary flags.

The mobile host MH establishes a link to any one of the base stations BS1~BS8, and then sends the position recording message to the linked base station, so that the position recording message is transferred from the linked base station through the routers from the lowest level to the highest level, thereby establishing the communication route between the host network 1 and the linked base station. The lower level routers send the same position recording message to all of the paired higher level routers which manage the lower level routers and provide the same communication route.

Figure 11:
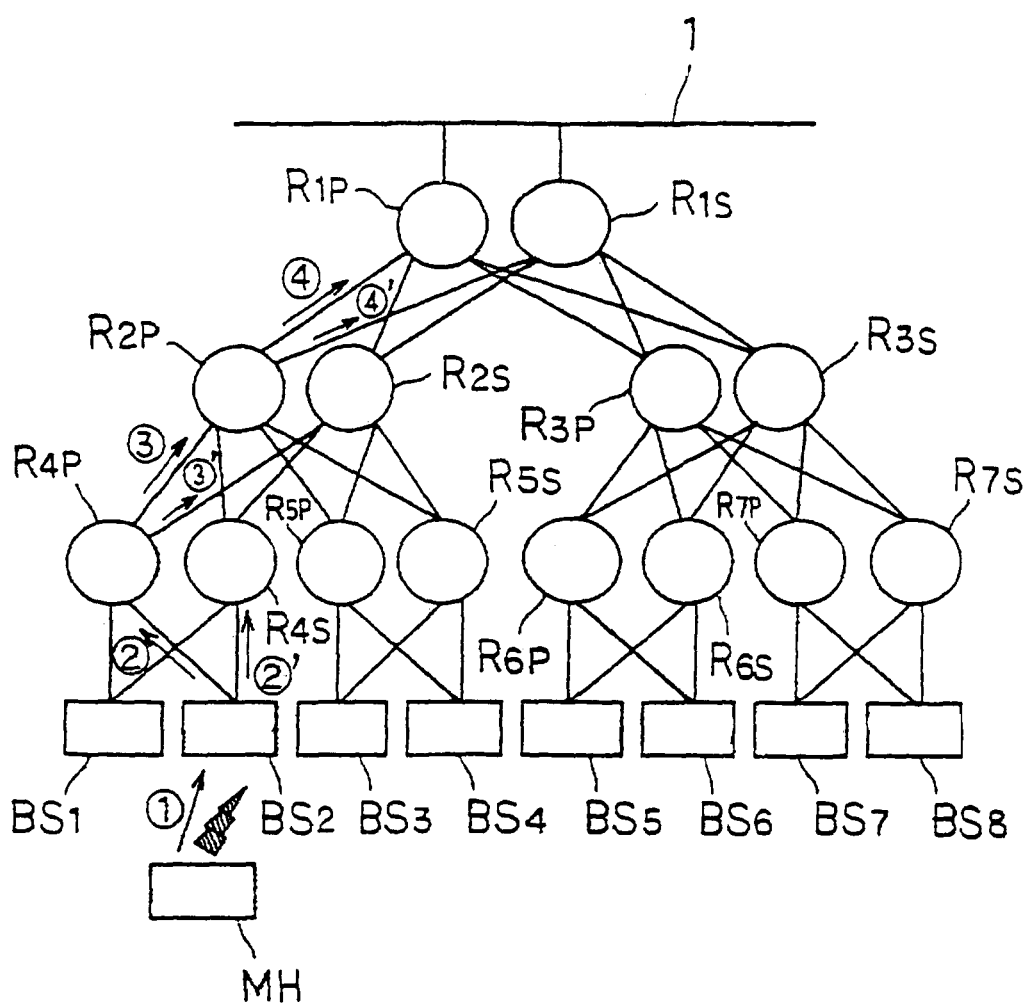
FIG. 11 is a block diagram illustrative of operations of the novel mobile communication network of FIG. 9.

FIG. 11 is a block diagram illustrative of operations of the novel mobile communication network of FIG. 9, wherein all of the primary and secondary routers are operational. The mobile host MH has established a link to the base station BS2, and the mobile host MH sends the position recording message to the base station BS2 in a first step (1). The base station BS2 transfers the position recording message to both the primary router R4p and the secondary router R4s which provides the same communication route in a second step (2) and (2'). The primary router R4p and the secondary router R4s update the routing information themselves based on the received position recording message.

The primary router R4p has already received, from the primary router R2p, the information that the primary flag is ON, whereby the primary router R4p has already been selected. The secondary router R4s has already received, from the primary router R2p, the information that the primary flag is OFF, whereby the secondary router R4s has been unselected.

The primary router R4p transfers the position recording message to both the primary router R2p and the secondary router R2s which provides the same communication route in a third step (3) and (3'). Since the secondary router R4s has been unselected, then the secondary router R4s does not transfer the position recording message. The primary router R2p and the secondary router R2s update the routing information themselves based on the received position recording message.

The primary router R2p has already received, from the primary router R1p, the information that the primary flag is ON, whereby the primary router R2p has already been selected. The secondary router R2s has already received, from the primary router R1p, the information that the primary flag is OFF, whereby the secondary router R2s has been unselected.

The primary router R2p transfers the position recording message to both the primary router R1p and the secondary router R1s which provides the same communication route in a fourth step (4) and (4'). Since the secondary router R2s has been unselected, then the secondary router R2s does not transfer the position recording message. The primary router R1p and the secondary router R1s update the routing information themselves based on the received position recording message.

As a result, a primary communication route can be established which includes the primary router R1p, the primary router R2p, the primary router R4p, and the base station BS2.

Figure 12:
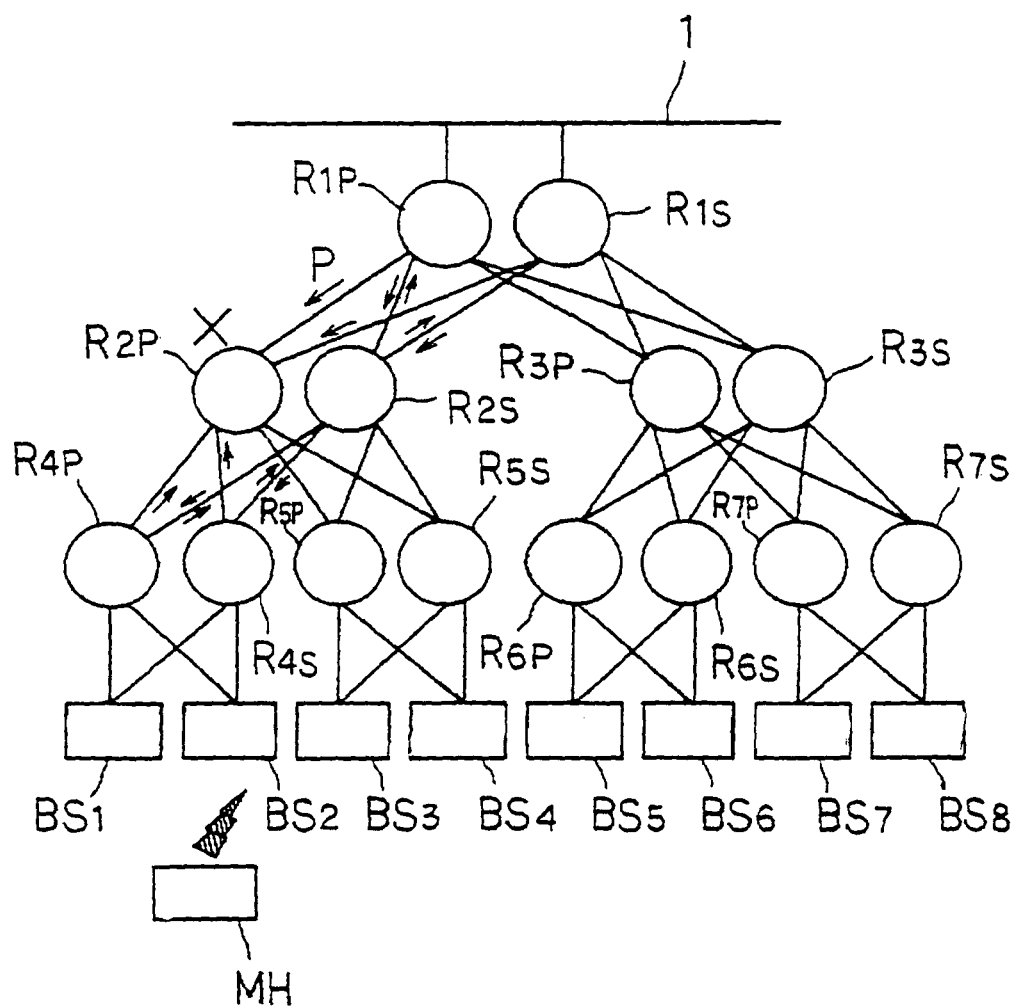
FIG. 12 is a block diagram illustrative of operations of the novel mobile communication network of FIG. 9.

FIG. 12 is a block diagram illustrative of operations of the novel mobile communication network of FIG. 9, wherein one of the primary routers becomes trouble and inoperational. If the primary router R2p becomes trouble and inoperational, then the troubled primary router R2p does not transfer the messages to the upper level primary and secondary routers R1p and R1s and the lower level primary and secondary routers R4p and R4s, whereby the above primary communication route becomes no longer available.

Figure 13:
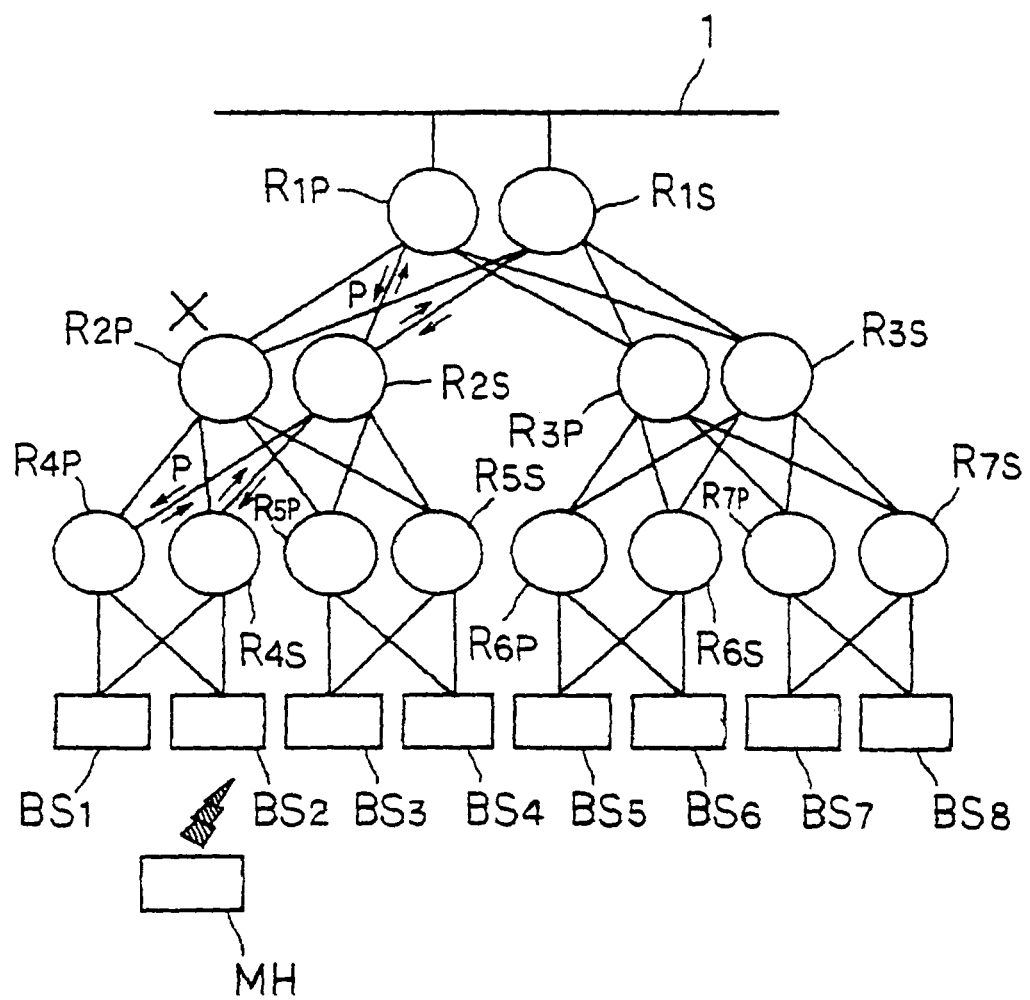
FIG. 13 is a block diagram illustrative of operations of the novel mobile communication network of FIG. 9.

FIG. 13 is a block diagram illustrative of operations of the novel mobile communication network of FIG. 9, wherein one of the secondary routers is selected alternative to the troubled primary router for allowing continuous communication. The troubled primary router R2p does not transfer the message, and the unselected secondary router R2s does not transfer the message. After the selected primary router R1p has not received any messages from the troubled primary router R2p and the unselected secondary router R2s during a predetermined time period, then the selected primary router R1p judges that the primary router R2p has been troubled and inoperational. The selected primary router R1p starts to periodically send the unselected secondary router R2s the information that the primary flag is ON, whereby the secondary router R2s is selected and becomes operational to provide the communication route instead of the troubled primary router R2p. Since the secondary router R2s have already had the same routing information as the primary router R2p, the secondary router R2s is operational to provide the communication route immediately after the secondary router R2s has been selected by the primary router R1p. As a result, an alternating communication route can immediately be established which includes the primary router R1p, the secondary router R2s, the primary router R4p and the base station BS2, whereby the continuous communication between the mobile host MH linked to the base station BS2 and the host network 1 can be realized.

As described above, in accordance with the second embodiment of the present invention, if at least any one of the primary routers Rnp on the already established communication route becomes once trouble and inoperational and the communication route becomes lost, then the paired secondary router Rns making the pair with the troubled primary router Rnp is selected by the upper level selected router managing those routers and becomes operational alternative to the troubled primary router Rnp, whereby the newly selected secondary router Rns provides the same communication route for allowing the continuation of the current communication between the mobile host MH and the host network 1.

Further, it is not required that the plural mobile hosts MH transmit respective plural position recording messages which are transferred through the hierarchy-networked routers Rn to the host network 1 for re-establishment of the communication route. It appear that the upper level router does not receive many position recording messages from the plural mobile hosts MH for re-establishment of the communication route, resulting in no problem with the increase in the load to the upper level router.

The number of hierarchy of the routers in the mobile communication network, the number of the base stations BS, and the number of the mobile host MH may be optional.

Third Embodiment

Figure 14:
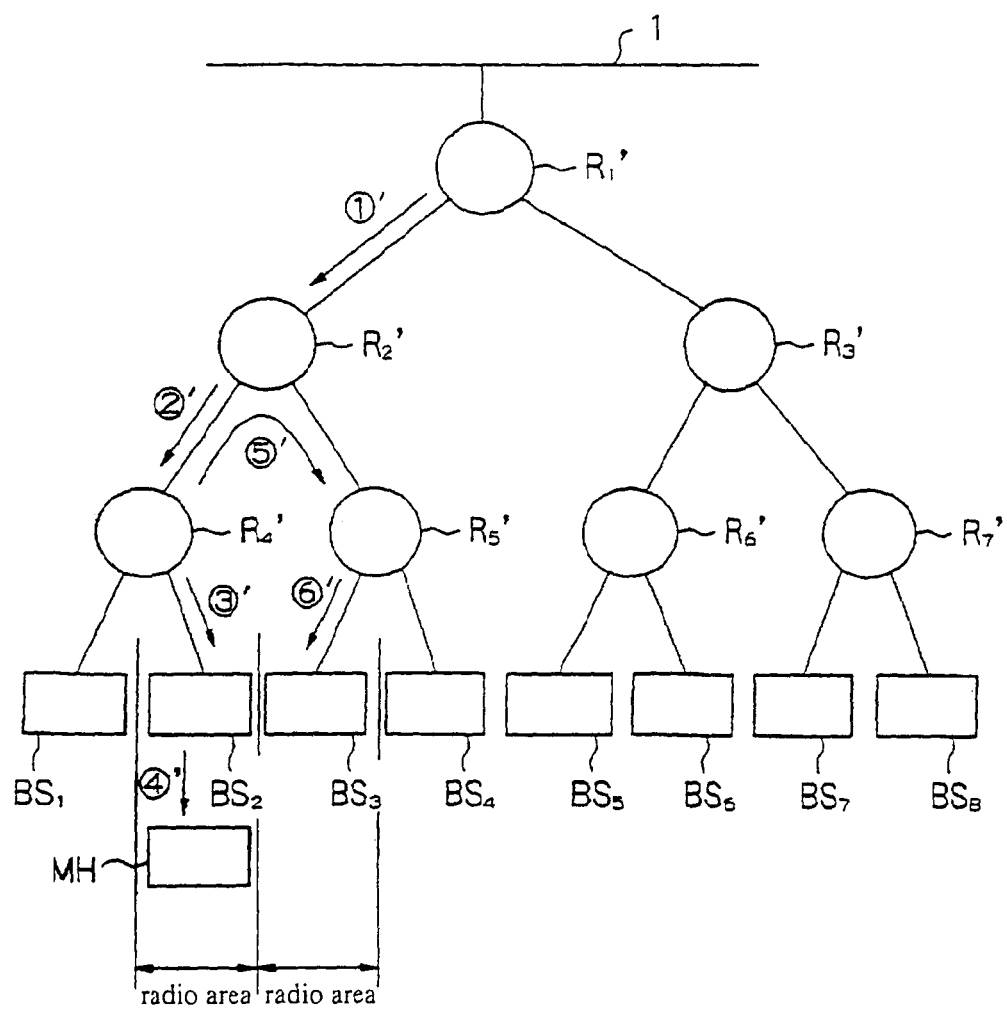
FIG. 14 is a block diagram illustrative of a novel mobile communication network in a third embodiment in accordance with the present invention.

A third embodiment according to the present invention will be described in detail with reference to the drawings. FIG. 14 is a block diagram illustrative of a novel mobile communication network in a third embodiment in accordance with the present invention. This mobile communication network is generally used for a management system for managing positions of mobile telephones or automatic cars. This mobile communication network utilizes transmission control protocol/internet protocol (TCP/IP) for realizing a packet communication.

As shown in FIG. 14, the mobile communication network includes a host network 1, plural routers Rn' (n=1~7), base stations BS1~BS8, and a mobile host MH. The host network 1 may comprise a wide area network such as internet. The routers Rn' provide multi-point connections between the host network 1 and the base stations BS1~BS8. The routers Rn' form a hierarchical network structure between the host network 1 and the base stations BS1~BS8. The router R1' is highest level router. The routers R2' and R3' are middle level routers which are connected to the router R1' and dominated by the router R'1. The routers R4', R5', R6' and R7' are lowest level routers, wherein the routers R4', R5', R6' and R7' are bicast routers. The bicast routers R4' and R5' are connected to the router R2' and dominated by the router R2', whilst the bicast routers R6' and R7' are connected to the router R3' and dominated by the router R3'. The base stations BS1 and BS2 are connected to the bicast router R4' and dominated by the bicast router R4'. The base stations BS3 and BS4 are connected to the bicast router R5' and dominated by the bicast router R5'. The base stations BS5 and BS6 are connected to the bicast router R6' and dominated by the bicast router R6'. The base stations BS7 and BS8 are connected to the bicast router R7' and dominated by the bicast router R7'.

Each of the bicast routers R4', R5', R6' and R7' also has additional informations about adjacent base stations to the corresponding base station managed by them. For example, the bicast router R4' manages the base stations BS1 and BS2. The bicast router R4' has informations that the base station BS2 is adjacent to the base station BS1, and the base stations BS1 and BS3 are adjacent to the base station BS2. The bicast router R5' manages the base stations BS3 and BS4. The bicast router R5' has informations that the base stations BS2 and BS4 are adjacent to the base station BS3, and the base stations BS3 and BS5 are adjacent to the base station BS4. The bicast router R6' manages the base stations BS5 and BS6. The bicast router R6' has informations that the base stations BS4 and BS6 are adjacent to the base station BS5, and the base stations BS5 and BS7 are adjacent to the base station BS6. The bicast router R7' manages the base stations BS7 and BS8. The bicast router R7' has informations that the base stations BS6 and BS8 are adjacent to the base station BS7, and the base station BS7 is adjacent to the base station BS8.

Each of the bicast routers R4', R5', R6' and R7' transmits the packet not only to the base station BSn which has been linked to the mobile host MH at a time when the packet has been transmitted from the host network 1 but also one or more unlinked base stations BSn adjacent to the above linked base station BSn, wherein the unlinked base station BSn has been unlinked at the above time. Namely, not only the linked base stations BSn but also the unlinked base stations BSn adjacent to the linked base station BSn have the same packet from the bicast router Rn'. If the mobile host MH moves from the radio area managed by the linked base station BSn to an adjacent radio area managed by the unlinked base station adjacent to the linked base station BSn, then the mobile host MH loses the link to the originally linked base station BSn and establishes a new link to the adjacent base station BSn to the originally linked base station BSn. As described above, however, not only the past-linked base station BSn but also the newly linked base station BSn have the same packet from the bicast router Rn. For this reason, the mobile host MH could receive the packet from the newly linked base station BSn but not from the past-linked base station BSn.

For example, as shown in FIG. 14, the mobile host MH has originally been linked to the base station BS2, and the original communication route has been established which includes the host network 1, the router R1', the router R2', the router R4', and the base station BS2. In this state, the packet is transferred from the host network 1 through the router R1', the router R2', and the bicast router R4' to the base station BS2 linked to the mobile host MH in the sequential steps (1'), (2'), (3') and (4') and further the packet is transferred from the bicast router R4' through the router R2' and the router R5' to the base station BS3 in the sequential steps (5') and (6').

In detail, the router R1' receives the packet from the host network 1. The router R1' transfers the packet to the router R2' in the first step (1'). The router R2' transfers the packet to the bicast router R4' in the second step (2'). The bicast router R4' transfers the packet to the base station BS2 in the third step (3'). The base station BS2 transmits the packet to the mobile host MH in the fourth step (4'). The bicast router R4' further transfers the packet through the router R2' to the router R5' in the fifth step (5'). The router R5' transfers the packet to the base station BS3 in the sixth step (6'), wherein the base station BS3 is adjacent to the base station BS2 linked to the mobile host MH. The base station BS3 transmits the received packet to the mobile host MH in the seventh step (7').

Figure 15:
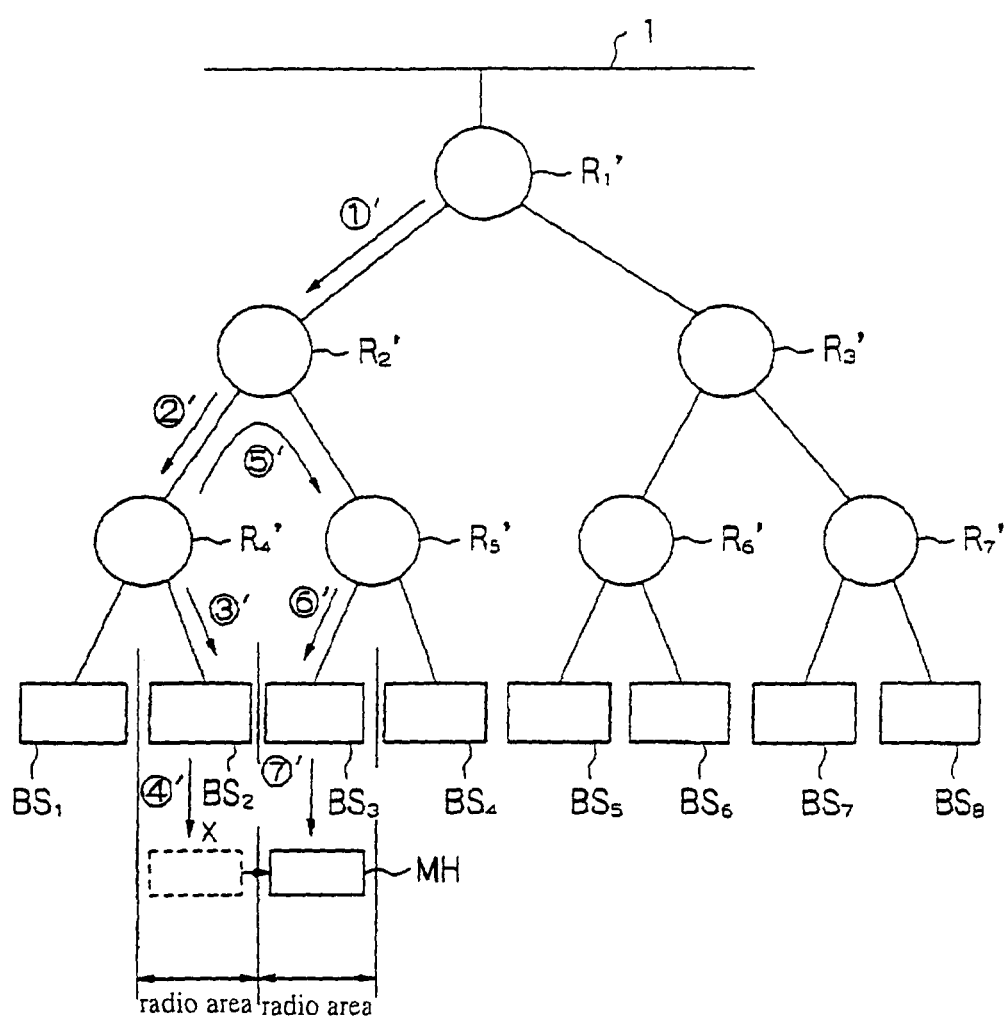
FIG. 15 is a block diagram illustrative of operation of the novel mobile communication network of FIG. 14.

FIG. 15 is a block diagram illustrative of operation of the novel mobile communication network of FIG. 14, when the mobile host MH moves to the adjacent radio area. If the mobile host MH moves from the original radio area managed by the base station BS2 to an adjacent radio area managed by the adjacent base station BS3 to the base station BS2, whereby the base station BS3 establishes a link to the mobile host MH based on the received position recording massage from the mobile host MH.

The base station BS2, which has received the packet from the bicast router R4', has already been unavailable to transmit the received packet to the mobile host MH since the mobile host MH has already been absent in the radio area managed by the base station BS2. The base station BD3, which has received the packet from the bicast router R5', has already been available to transmit the received packet to the mobile host MH since the mobile host MH has already been present in the radio area managed by the base station BS3, and has already established the link to the mobile host MH.

Even if the movement of the mobile host MH from the radio area managed by the base station BS2 to the adjacent radio area~managed by the base station BS3 appears during the transfer of the packet through the mobile communication network or after the packet has, been transmitted from the host network 1 and before the packet reaches the base station BS2, then the mobile host MH surely receives the packet from the base station BS3 because the bicast router R4' not only has transferred the packet to the base station BS2 managed by the bicast router R4' but also has transferred the packet through the router R2' and the router R5' to the base station BS3 adjacent to the base station BS2.

Accordingly, the above novel mobile communication network including the bicast routers in the lowest level in hierarchical network structure of the routers always transfers the packet to not only the originally-linked base station BS2 but also the originally-unlinked base station BS3 adjacent to the originally-linked base station BS2, whereby if the movement of the mobile host MH from the radio area managed by the base station BS2 to the adjacent radio area managed by the base station BS3 appears during the transfer of the packet through the mobile communication network or after the packet has been transmitted from the host network 1 and before the packet reaches the base station BS2, then the mobile host MH surely receives the packet from the base station BS3 because the bicast router R4' not only has transferred the packet to the base station BS2 managed by the bicast router R4' but also has transferred the packet through the router R2' and the router R5' to the base station BS3 adjacent to the base station BS2.

In accordance with the above-described novel mobile communication network, the bicast routers are selectively provided only at the lowest level of the hierarchical network structure of the routers, wherein the routers connected directly to the base stations become the bicast routers, so that the bicast operations of the packets are conducted only at the lowest level of the hierarchical network structure of the routers. This makes the host network 1 free from the requirement for controlling the bicast operations, whereby the load to the host network 1 can be reduced.

The hierarchical network structure of the routers simples the routing informations and inter-relationship between adjacent base stations and respective hierarchical levels of the routers. Respective loads to the routers for managing those informations can be reduced.

The hierarchical-level of the bicast or multicast routers would basically be optional. Notwithstanding, in accordance with the embodiment described above, the bicast routers are selectively provided only at the lowest level of the hierarchical network structure of the routers. Thus, the bicast router R4' additionally transfers the packet through the higher level router R2' and the bicast router R5' to the base station BS3 adjacent to the base station BS2 managed by the bicast router R4'. In view of possible reduction to the traffic mount of the packets, it is possible that the middle level routers R2' and R3' become the bicast routers in place of the lowest level routers R4', R5', R6' and R7', because the middle level router R2' indirectly images both the adjacent two radio areas directly covered by the adjacent two base stations BS2 and BS3.

The mobile communication network of this third embodiment is free from any requirement for complicated control processes to the communication routing, for which reason the load to the each router can be reduced.

The number of hierarchy of the routers in the mobile communication network, the number of the base stations BS, and the number of the mobile host MH may be optional.

Fourth Embodiment

Figure 16:
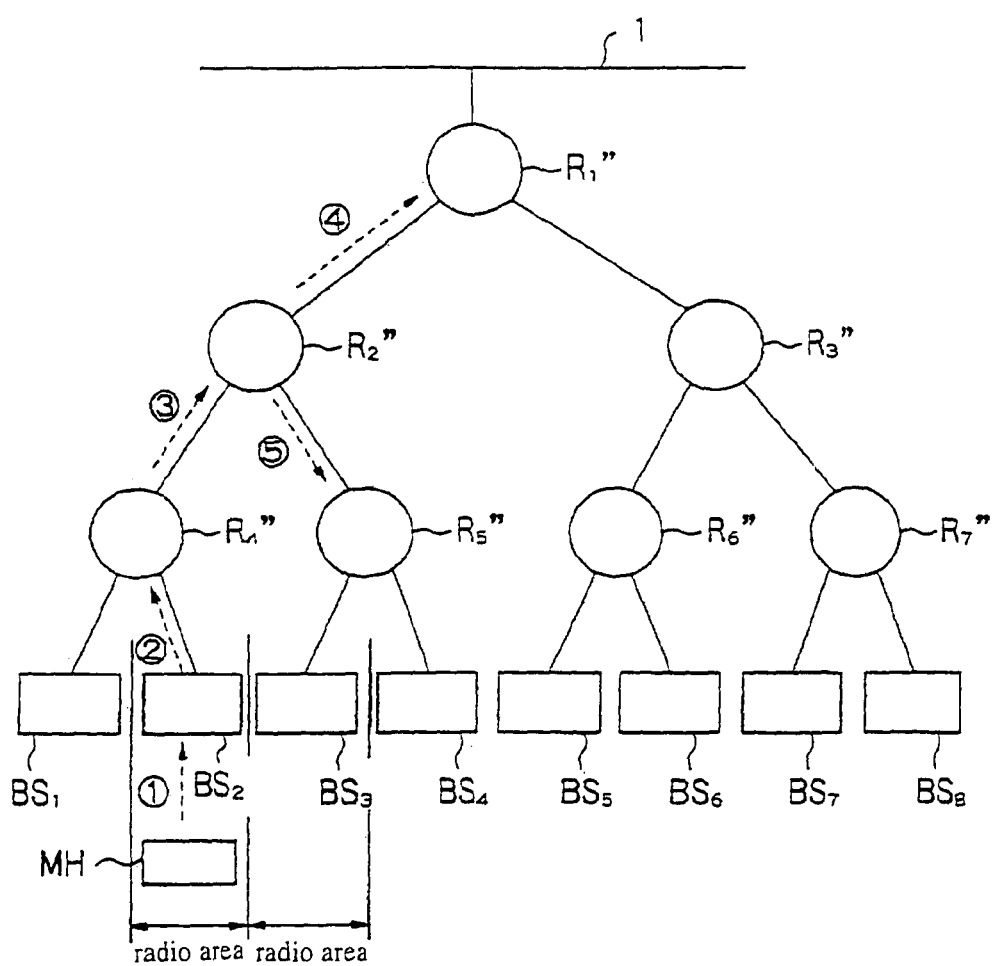
FIG. 16 is a block diagram illustrative of a novel mobile communication network in a fourth embodiment in accordance with the present invention.

A fourth embodiment according to the present invention will be described in detail with reference to the drawings. FIG. 16 is a block diagram illustrative of a novel mobile communication network in a fourth embodiment in accordance with the present invention. This mobile communication network is generally used for a management system for managing positions of mobile telephones or automatic cars. This mobile communication network utilizes transmission control protocol/internet protocol (TCP/IP) for realizing a packet communication.

As shown in FIG. 16, the mobile communication network includes a host network 1, plural routers Rn" (n=1~7), base stations BS1~BS8, and a mobile host MH. The host network 1 may comprise a wide area network such as internet. The routers Rn" provide multi-point connections between the host network 1 and the base stations BS1~BS8. The routers Rn" form a hierarchical network structure between the host network 1 and the base stations BS1~BS8. The router R1" is highest level router. The routers R2" and R3" are middle level routers which are connected to the router R1" and dominated by the router R1". The routers R2" and R3" are bicast routers. The routers R4", R5", R6" and R7" are lowest level routers. The routers R4" and R5" are connected to the bicast router R2" and dominated by the bicast router R2", whilst the routers R6" and R7" are connected to the bicast router R3" and dominated by the bicast router R3". The base stations BS1 and BS2 are connected to the router R4" and dominated by the router R4". The base stations BS3 and BS4 are connected to the router R5" and dominated by the router R5". The base stations BS5 and BS6 are connected to the router R6" and dominated by the router R6". The base stations BS7 and BS8 are connected to the router R7" and dominated by the router R7".

In this fourth embodiment, the bicast routers are the routers which indirectly manage both the originally linked base station BSn to the mobile host MH and the originally unlinked base station BSn adjacent to the originally linked base station BSn, wherein each of the bicast routers is positioned on a branch point of both an original communication route between the host network 1 and the originally linked base station BSn and an adjacent communication route between the host network 1 and the originally unlinked base station BSn adjacent to the originally linked base station BSn.

In this embodiment, each of the middle level routers R2" and R3" is positioned on a branch point of both an original communication route between the host network 1 and the originally linked base station BSn and an adjacent communication route between the host network 1 and the originally unlinked base station BSn adjacent to the originally linked base station BSn. For this reason, the middle level routers R2" and R3" become the bicast routers.

Therefore, a retrieval is made to the router which is positioned at the branch point of both the original communication route between the host network 1 and the originally linked base station BSn and the adjacent communication route between the host network 1 and the originally unlinked base station BSn adjacent to the originally linked base station BSn. The retrieved router acts as the bicast router which performs the bicast of the received packet, wherein the bicast router transfers the packet not only to the originally linked base station BSn which has already been linked to the mobile host MH but also to the originally unlinked base station BSn adjacent to the originally linked base station BSn.

The detailed descriptions will be made with reference to FIG. 16. The mobile host MH is present in the radio area covered by the base station BS2 which has originally been linked to the mobile host MH. The base station BS2 corresponds to the originally linked base station. The base station BS3 is positioned adjacent to the originally linked base station BS2. This base station BS3 has been unlinked to the mobile host MH. This base station BS3 corresponds to the originally unlinked base station adjacent to the originally linked base station BS2.

The mobile host MH transmits a position recording message to the originally linked base station BS2 in the first step (1). The originally linked base station BS2 transmits the received position recording message to the router R4" which manages the originally linked base station BS2 in the second step (2). The router R4" updates the routing information itself based on the received position recording message. The router R4" also confirm whether the router R4" is available or unavailable to manage the originally unlinked base station BS3 adjacent to the originally linked base station BS2 based on the received position recording message. Since the router R4" is unavailable to manage the originally unlinked base station BS3, the router R4" sends the bicast router R2" not only the received position recording message but also a branch point retrieving message for retrieving a branch point of both an original communication route between the host network 1 and the originally linked base station BS2 and an adjacent communication route between the host network 1 and the originally unlinked base station BS3 adjacent to the originally linked base station BS2 in the third step (3).

The bicast router R2" updates the routing information itself based on the received position recording message. The bicast router R2" also confirm whether the bicast router R2" is available or unavailable to manage the originally unlinked base station BS3 adjacent to the originally linked base station BS2 based on the received position recording message. Since the bicast router R2" is available to manage the originally unlinked base station BS3, the bicast router R2" incorporates the routing information with the effect that the bicast router R2" performs the bicast operation. The bicast router R2" transfers the position recording message to the router R1" in the fourth step (4). The bicast router R2" further sends an adjacent communication route establishing message to the router R5" managing the originally unlinked base station BS3 adjacent to the originally linked base station BS2, wherein the adjacent communication route establishing message is to additionally establish an adjacent communication route between the host network 1 and the originally unlinked base station BS3 adjacent to the originally linked base station BS2 in the fifth step (5).

The router R1" updates the routing information itself based on the received position recording message, whereby an original communication route as a primary communication route is established, which includes the router R1", the bicast router R2", the router R4" and the originally linked base station BS2. The router R5" newly establishes a new communication route to the originally unlinked base station BS3 adjacent to the originally linked base station BS2, based on the received adjacent communication route establishing message. As a result, the adjacent communication route is established which includes the router R1", the bicast router R2", the router R5" and the originally unlinked base station BS3 adjacent to the originally linked base station BS2.

Figure 17:
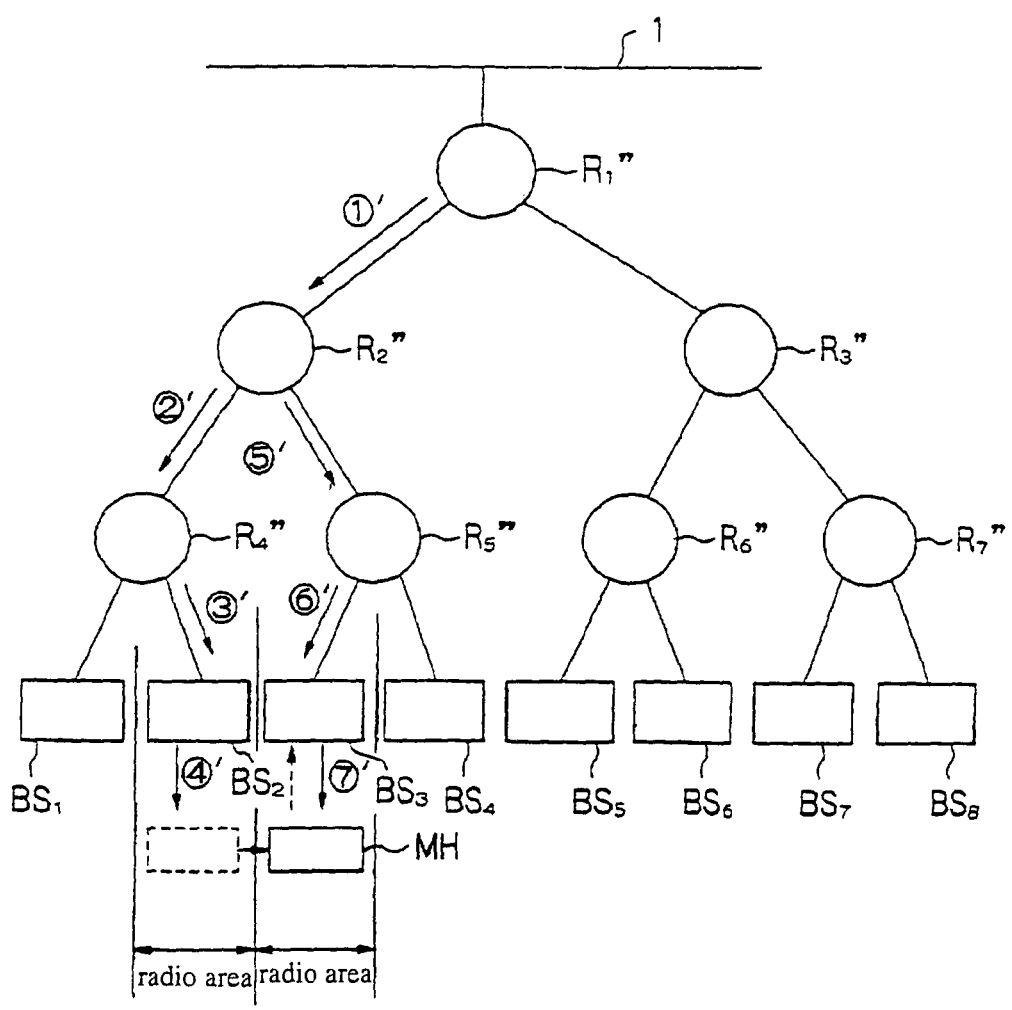
FIG. 17 is a block diagram illustrative of operations of the packet transfer in the mobile communication network of FIG. 16.

FIG. 17 is a block diagram illustrative of operations of the packet transfer in the mobile communication network of FIG. 16. Since both the original communication route and the adjacent communication route have been established, then the packet supplied from the host network 1 is transferred through both the original communication route and the adjacent communication route to the originally linked base station BS2 and the originally unlinked base station BS3 respectively.

The router R1" receives the packet from the host network 1 and transfers the received packet to the bicast router R2" in the first step (1'). The bicast router R2" transfers the received packet to both the router R4" and the router R5" through the original communication route and the adjacent communication route respectively in the second and fifth steps (2') and (5'). The router R4" transfers the received packet to the originally linked base station BS2 linked to the mobile host MH through the original communication route in the third step (3'). The router R5" transfers the received packet to the originally unlinked base station BS3 through the adjacent communication route in the sixth step (6').

If the mobile host MH moves from the original radio area managed by the originally linked base station BS2 to the adjacent radio area managed by the originally unlinked base station BS3 adjacent to the originally linked base station BS2, then the originally linked base station BS2 loses the link to the mobile host MH, whereby the originally linked base station BS2 becomes the past-linked base station or the currently unlinked base station. The originally unlinked base station BS3 establishes a new link to the mobile host MH, whereby the originally unlinked base station BS3 becomes the newly linked base station. The base station BS2 has become unavailable to transmit the packet to the mobile host MH because the mobile host MH has already been absent in the original radio area managed by the base station BS2. However, the base station BS3 adjacent to the base station BS2 has the link to the mobile host MH which has been present in the adjacent radio area managed by the base station BS3. The adjacent base station BS3 has already become available to transmit the packet to the mobile host MH. For this reason, the mobile host MH present in the adjacent radio area could receive the packet from the adjacent base station BS3.

The original communication route, which includes the router R1", the bicast router R2", the router R4" and the base station BS2, has become the subordinate or secondary communication path. The adjacent communication route, which includes the router R1", the bicast router R2", the router R5" and the base station BS3, has become the main or primary communication path.

Even if the movement of the mobile host MH from the radio area managed by the base station BS2 to the adjacent radio area managed by the base station BS3 appears during the transfer of the packet through the mobile communication network or after the packet has been transmitted from the host network 1 and before the packet reaches the base station BS2, then the mobile host MH surely receives the packet from the base station BS3 because the bicast router R2' not only has transferred the packet to the base station BS2 managed by the router R4' but also has transferred the packet to the base station BS3 adjacent to the base station BS2.

Accordingly, the above novel mobile communication network includes the bicast routers which are positioned at the branch points of both the original communication route between the host network 1 and the originally linked base station BSn and the adjacent communication route between the host network 1 and the originally unlinked base station BSn adjacent to the originally linked base station BSn. The bicast router positioned at the communication route branch point always transfers the packet to not only the originally-linked base station BS2 but also the originally-unlinked base station BS3 adjacent to the originally-linked base station BS2, whereby if the movement of the mobile host MH from the radio area managed by the base station BS2 to the adjacent radio area managed by the base station BS3 appears during the transfer of the packet through the mobile communication network or after the packet has been transmitted from the host network 1 and before the packet reaches the base station BS2, then the mobile host MH surely receives the packet from the base station BS3 because the bicast router R2" not only has transferred the packet to the base station BS2 but also has transferred the packet to the base station BS3 adjacent to the base station BS2.

The bicast router positioned at the communication route branch point reduces the probability of packet loss. The bicast router positioned at the communication route branch point also reduces the amount of traffic of the packet as compared to the above-described third embodiment.

In accordance with this fourth embodiment, as described above, the bicast router further sends an adjacent communication route establishing message to the lower level router managing the originally unlinked base station adjacent to the originally linked base station, in order to additionally establish the adjacent communication route between the host network and the originally unlinked base station adjacent to the originally linked base station. Notwithstanding, it is possible modify the above structure as follows.

The bicast router does not establish the above adjacent communication route. The bicast router adds the received packet addressed to the mobile host MH with an adjacent address to the adjacent base station for changing a destination of the packet in order to transfer the destination-changed packet to the adjacent base station only without transferring the packet to the originally linked base station. This modification may reduce the traffic amount. It is effective to design this modified communication network optionally in consideration of the acceptable traffic capacity of the network.

Further, the lowest level router R4" sends the higher level router R2" the branch point retrieving message for retrieving the branch point of both the original communication route between the host network 1 and the originally linked base station BS2 and the adjacent communication route between the host network 1 and the originally unlinked base station BS3 adjacent to the originally linked base station BS2.

It is possible as a modification that the mobile host MH transmits the branch point retrieving message through the base station BSn to the routers Rn. In this modification, the mobile host MH measures the intensity of each of respective radio waves transmitted from the other base stations than the originally linked base station BS2, so that the base station transmitting the most intensive radio wave is defined to be the adjacent base station. The mobile host MH transmits a branch point retrieving message for retrieving a branch point of both the original communication route between the host network 1 and the originally linked base station and an adjacent communication route between the host network 1 and the defined adjacent base station.

If the mobile host further moves and other base station than the defined adjacent base station becomes transmitting the most intensive radio wave, then the mobile host MH further transmits a new branch point retrieving message for newly retrieving a new branch point of both the current communication route between the host network 1 and the currently linked base station and a new adjacent communication route between the host network 1 and the newly defined adjacent base station, instead of the past-defined adjacent base station.

In addition to the above transmission of the new branch point retrieving message, the mobile host MH furthermore transmits a bicast release message to the currently bicast router R2". The currently bicast router R2" receives the bicast release message from the mobile host MH, and the currently bicast router R2" becomes normal or unicast router which transfers the packet along the primary communication route only, unless the currently bicast router R2" remains still positioned at the new branch point of the current communication route and the new adjacent communication route. If the currently bicast router R2" remains still positioned at the new branch point of the current communication route and the new adjacent communication route, then, of course, the currently bicast router R2" remains acting as the bicast router even receipt of the bicast release message from the mobile host MH. This modified structure is effective in case that the adjacent base station is likely to be changed frequently.

The number of hierarchy of the routers in the mobile communication network, the number of the base stations BS, and the number of the mobile host MH may be optional.

Fifth Embodiment

A fifth embodiment according to the present invention will be described in detail with reference to the drawings. As described in the third and fourth embodiments, the bicast system is effective to reduce the probability of the packet loss upon the movement of the mobile host MH to the adjacent radio area. However, the problem with the packet loss may be raised if the same packets are transmitted from the adjacent two base stations at the timing when the mobile host MH moves across the boundary area between the adjacent radio areas, whereby the packet-transport performance of the network is reduced. The present fifth embodiment is to solve these problem and surely prevent the packet loss even if the same packets are transmitted from the adjacent two base stations at the timing when the mobile host MH moves across the boundary area between the adjacent radio areas.

Figure 18:
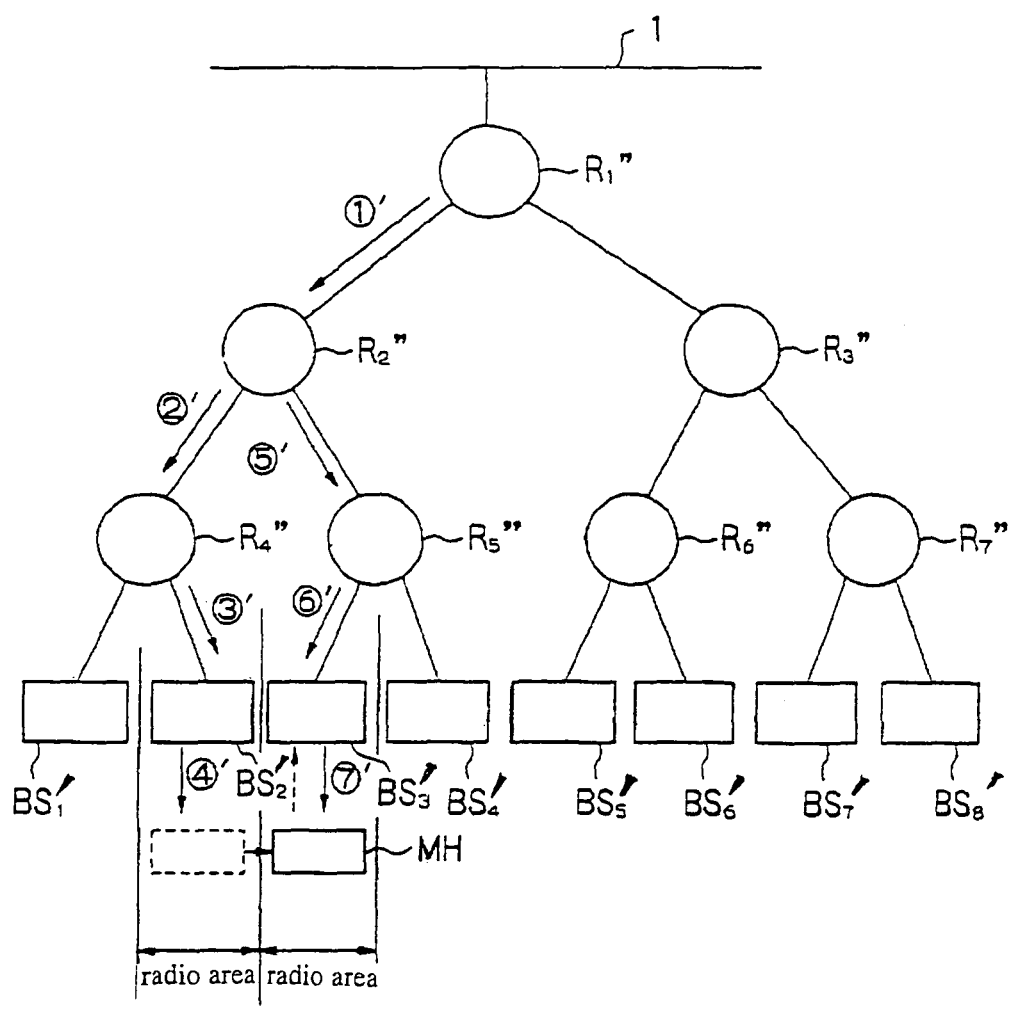
FIG. 18 is a block diagram illustrative of a novel mobile communication network in a fifth embodiment in accordance with the present invention.

The mobile communication network of this fifth embodiment is different from the mobile communication network of the above fourth embodiment only in the base stations. FIG. 18 is a block diagram illustrative of a novel mobile communication network in a fifth embodiment in accordance with the present invention. This mobile communication network is generally used for a management system for managing positions of mobile telephones or automatic cars. This mobile communication network utilizes transmission control protocol/internet protocol (TCP/IP) for realizing a packet communication.

As shown in FIG. 18, the mobile communication network includes a host network 1, plural routers Rn" (n=1~7), base stations BS40~BS8', and a mobile host MH. The host network 1 may comprise a wide area network such as internet. The routers Rn" provide multi-point connections between the host network 1 and the base stations BS1'~BS8'. The routers Rn" form a hierarchical network structure between the host network 1 and the base stations BS1'~BS8'. The router R1" is highest level router. The routers R2" and R3" are middle level routers which are connected to the router R1" and dominated by the router R1". The routers R2" and R3" are bicast routers. The routers R4", R5", R6" and R7" are lowest level routers. The routers R4" and R5" are connected to the bicast router R2" and dominated by the bicast router R2", whilst the routers R6" and R7" are connected to the bicast router R3" and dominated by the bicast router R3". The base stations BS1' and BS2' are connected to the router R4" and dominated by the router R4". The base stations BS3' and BS4' are connected to the router R5" and dominated by the router R5". The base stations BS5' and BS6' are connected to the router R6" and dominated by the router R6". The base stations BS7' and BS8' are connected to the router R7" and dominated by the router R7".

In this fifth embodiment, the bicast routers are the routers which indirectly manage both the originally linked base station BSn' to the mobile host MH and the originally unlinked base station BSn' adjacent to the originally linked base station BSn', wherein each of the bicast routers is positioned on a branch point of both an original communication route between the host network 1 and the originally linked base station BSn' and an adjacent communication route between the host network 1 and the originally unlinked base station BSn' adjacent to the originally linked base station BSn'.

In this embodiment, each of the middle level routers R2" and R3" is positioned on a branch point of both an original communication route between the host network 1 and the originally linked base station BSn' and an adjacent communication route between the host network 1 and the originally unlinked base station BSn' adjacent to the originally linked base station BSn'. For this reason, the middle level routers R2" and R3" become the bicast routers.

Therefore, a retrieval is made to the router which is positioned at the branch point of both the original communication route between the host network 1 and the originally linked base station BSn' and the adjacent communication route between the host network 1 and the originally unlinked base station BSn' adjacent to the originally linked base station BSn'. The retrieved router acts as the bicast router which performs the bicast of the received packet, wherein the bicast router transfers the packet not only to the originally linked base station BSn' which has already been linked to the mobile host MH but also to the originally unlinked base station BSn' adjacent to the originally linked base station BSn'.

Each of the base stations BS1'~BS8' further has an additional function of queuing the packet, provided that the base station BSn' is positioned on at a terminal of the adjacent communication route, in order to prevent the originally linked base station and the adjacent base station from concurrently transmitting the same packets. The adjacent base station queues the packet until the mobile host MH has become present in the adjacent radio area and sends the adjacent base station a notice that the mobile host MH has become present in the adjacent radio area. After the adjacent base station receives this notice from the mobile host MH, then the adjacent base station transmits the packet to the mobile host MH. As a result, the mobile host. MH could surely receive the packet from the adjacent base station after the mobile host MH has entered into the adjacent radio area, even the packet was also transmitted from the originally linked base station at the timing when the mobile host MH moved across the boundary area between the adjacent radio areas.

In this embodiment, each of the middle level routers R2" and R3" is positioned on a branch point of both an original communication route between the host network 1 and the originally linked base station BSn' and an adjacent communication route between the host network 1 and the originally unlinked base station BSn' adjacent to the originally linked base station BSn'. For this reason, the middle level routers R2" and R3" become the bicast routers.

Therefore, a retrieval is made to the router which is positioned at the branch point of both the original communication route between the host network 1 and the originally linked base station BSn' and the adjacent communication route between the host network 1 and the originally unlinked base station BSn' adjacent to the originally linked base station BSn'. The retrieved router acts as the bicast router which performs the bicast of the received packet, wherein the bicast router transfers the packet not only to the originally linked base station BSn' which has already been linked to the mobile host MH but also to the originally unlinked base station BSn' adjacent to the originally linked base station BSn'.

The mobile host MH transmits a position recording message to the originally linked base station BS2'. The originally linked base station BS2' transmits the received position recording message to the router R4" which manages the originally linked base station BS2'. The router R4" updates the routing information itself based on the received position recording message. The router R4" also confirms whether the router R4" is available or unavailable to manage the originally unlinked base station BS3' adjacent to the originally linked base station BS2' based on the received position recording message. Since the router R4" is unavailable to manage the originally unlinked base station BS3, the router R4" sends the bicast router R2" not only the received position recording message but also a branch point retrieving message for retrieving a branch point of both an original communication route between the host network 1 and the originally linked base station BS2' and an adjacent communication route between the host network 1 and the originally unlinked base station BS3' adjacent to the originally linked base station BS2'.

The bicast router R2" updates the routing information itself based on the received position recording message. The bicast router R2" also confirm whether the bicast router R2" is available or unavailable to manage the originally unlinked base station BS3' adjacent to the originally linked base station BS2' based on the received position recording message. Since the bicast router R2" is available to manage the originally unlinked base station BS3', the bicast router R2" incorporates the routing information with the effect that the bicast router R2" performs the bicast operation. The bicast router R2" transfers the position recording message to the router R1". The bicast router R2" further sends an adjacent communication route establishing message to the router R5" managing the originally unlinked base station BS3' adjacent to the originally linked base station BS2', wherein the adjacent communication route establishing message is to additionally establish an adjacent communication route between the host network 1 and the originally unlinked base station BS3' adjacent to the originally linked base station BS2'.

The router R1" updates the routing information itself based on the received position recording message, whereby an original communication route as a primary communication route is established, which includes the router R1", the bicast router R2", the router R4" and the originally linked base station BS2'. The router R5" newly establishes a new communication route to the originally unlinked base station BS3' adjacent to the originally linked base station BS2', based on the received adjacent communication route establishing message. As a result, the adjacent communication route is established which includes the router R1", the bicast router R2", the router R5" and the originally unlinked base station BS3' adjacent to the originally linked base station BS2'.

Since both the original communication route and the adjacent communication route have been established, then the packet supplied from the host network 1 is transferred through both the original communication route and the adjacent communication route to the originally linked base station BS2' and the originally unlinked base station BS3' respectively, wherein the originally unlinked base station BS3' positioned at the terminal of the adjacent communication route queues the packet.

In addition to the above description about operation of the above bicast router R2", the bicast router R2" further adds the received packet with a transmission sequence label which indicates a sequence of transmission of the packet, before the bicast router R2" sends the packet with the transmission sequence label to the routers R4" and R5". The bicast router R2" puts a label value as the transmission sequence label on a flow label field or an option field of a header format of the packet. The label value distinguishes the sequence in transmission of the packet. The label values may comprise continuous values, for example, 100, 101, 102, - - - or discontinuous values 100, 105, 110, 1150, - - -.

If the mobile host MH moves from the original radio area managed by the originally linked base station BS2' to the adjacent radio area managed by the originally unlinked base station BS3' adjacent to the originally linked base station BS2', then the originally linked base station BS2' loses the link to the mobile host MH, whereby the originally linked base station BS2' becomes the past-linked base station or the currently unlinked base station. The originally unlinked base station BS3' establishes a new link to the mobile host MH, whereby the originally unlinked base station BS3' becomes the newly linked base station. The base station BS2' has become unavailable to transmit the packet to the mobile host MH because the mobile host MH has already been absent in the original radio area managed by the base station BS2'. However, the base station BS3' adjacent to the base station BS2' has the link to the mobile host MH which has been present in the adjacent radio area managed by the base station BS3'. The adjacent base station BS3' has already become available to transmit the packet to the mobile host MH. For this reason, the mobile host MH present in the adjacent radio area could receive the packet from the adjacent base station BS3'.

After the mobile host MH has established the link to the base station BS3', then the mobile host MH sends the base station BS3' not only the position recording message but also the last-received label value which had, in the past, been received from the past-linked base station BS2'. The base station BS3' receives the last-received label value from the mobile host MH, wherein the base station BS3' has currently queuing packets. The base station BS3' discards all of the packets having label values which are lower than the last-received label value from the mobile host MH, and the base station BS3' sends the mobile host MH the residual queuing packets having label values equal to or higher than the last-received label value after the mobile host MH has entered into the radio area managed by the newly linked base station BS3.

As a result, even if the movement of the mobile host MH from the radio area managed by the base station BS2' to the adjacent radio area managed by the base station BS3' appears during the transmission of the packet from the originally linked base station BS2, then the base station BS3' queues the received packet. After the mobile host MH has entered into the adjacent radio area managed by the base station BS3', then the base station BS3' receives the label value from the mobile host MH, whereby the base station BS3' selectively discards the queuing packets based on the received label value, so that the base station BS3' sends the residual queuing packet to the mobile host MH. Therefore, no packet loss appears in any conditions, and a desirable high throughout of the mobile communication hierarchical network can be obtained.

In accordance with the above fifth embodiment, the base station BSn' at the terminal of the adjacent communication route performs queuing the packet. It is also possible as a modification that the lowest level router on the adjacent communication route would perform queuing the packet. For example, in place of the base station BS3', then the router 5" queues the packet. After the mobile host MH has entered into the adjacent radio area managed by the base station BS3', then the base station BS3' receives the label value from the mobile host MH and transfers the received label value to the router 5", whereby the router 5" selectively discards the queuing packets based on the received label value, so that the router 5" sends the residual queuing packet to the base station BS3' and the base station BS3' transmits the packet to the mobile host MH. Therefore, no packet loss also appears in any conditions, and a desirable high throughout of the mobile communication hierarchical network can also be obtained.

The adjacent radio areas are, in general, bounded through the overlap boundary area. It is possible that the mobile host MH being just present in the overlap boundary area between the adjacent radio areas could receive the duplications of the same packet from both the adjacent base stations managing the adjacent radio areas. In this case, it is preferable that the packet has the label value which indicates the transmission sequence of the packet, so that the mobile host MH receives the packet with the label value, so that the mobile host MH verifies whether the just received packet is identical with the already-received packet with reference to the label value. If the just received packet is identical with the already-received packet, then it is possible that the mobile host MH discards the duplicate packet.

In this fifth embodiment, the hierarchical network of the routers is identical with that of the fourth embodiment, wherein the bicast routers are the routers R2" and R3" which are higher in level than the lowest level routers R4", R5", R6" and R7". It is also possible that the hierarchical network of the routers is identical with the third embodiment, wherein the bicast routers are the lowest level routers R4", R5", R6" and R7".

The number of hierarchy of the routers in the mobile communication network, the number of the base stations BS, and the number of the mobile host MH may be optional.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A communication network comprising:
a host network;
a plurality of base stations;
at least a mobile host capable of establishing links to said base stations; and
a hierarchy-network of plural routers providing multiple-point routings between said base stations and said host network, and said routers including at least a primary page-area managing router for managing at least a page area for recording said mobile host and a secondary page-area managing router for back-up managing the page area, said primary and secondary page-area routers receiving a same routing information for managing the page area, said primary page-area router being designated by a primary flag that is ON, wherein said primary page-area managing router limits, within a predetermined number, the number of transfer-acceptable packets in unicast packets addressed to said mobile host and received in a first predetermined time period while said mobile host is in a stand-by state, so that said primary page-area managing router transfers only said transfer-acceptable packets to sub-ordinate routers managed by said primary page-area managing router, and said primary page-area managing router does not transfer exceeding transfer-requested packets received additionally to said transfer-acceptable packets in said first predetermined time period, and requests a caller, which transmits said unicast packets, to stop transmission of said unicast packets until a second predetermined time period has passed and then to restart the transmission of said unicast packets, and wherein when said primary router is not operating, said secondary router has a primary flag turned ON to become a new primary router that manages the page area with the previously received same routing information.

2. The communication network as claimed in claim 1, wherein said page-area managing router discards said exceeding transfer-requested packets.

3. The communication network as claimed in claim 1, wherein said page-area managing router is capable of setting said predetermined number for said transfer-acceptable packets.

4. The communication network as claimed in claim 3, wherein said predetermined number is a natural number.

5. The communication network as claimed in claim 1, wherein said page-area managing router is capable of setting said predetermined time period.

6. The communication network as claimed in claim 1, wherein said page-area managing router transmits, through said host network to a caller, a second packet-transmission suppression request which requests said caller to widen a time interval of discontinuous transmission of said packets.

7. The communication network as claimed in claim 1, wherein said page-area managing router transmits, through said host network to a caller, a second packet-transmission suppression request which requests said caller to stop transmission of said packet until said predetermined time period has passed, and re-start said packet transmission thereafter.

8. A method of controlling a communication network comprising a host network; a plurality of base stations; at least a mobile host capable of establishing links to said base stations; and a hierarchy-network of plural routers providing multiple-point routings between said base stations and said host network, and said routers including at least a primary page-area managing router for managing at least a page area for recording said mobile host and a secondary page-area managing router for back-up managing the page area, said primary and secondary page-area routers receiving a same routing information for managing the page area, said primary page-area router being designated by a primary flag that is ON, the method comprising:
said primary page-area managing router limiting, within a predetermined number, the number of transfer-acceptable packets in unicast packets addressed to said mobile host and received in a first predetermined time period while said mobile host is in a stand-by state, so that said primary page-area managing router transfers only said transfer-acceptable packets to sub-ordinate routers managed by said primary page-area managing router, and said primary page-area managing router does not transfer exceeding transfer-requested packets received additionally to said transfer-acceptable packets in said first predetermined time period, and requests a caller, which transmits said unicast packets, to stop transmission of said unicast packets until a second predetermined time period has passed and then to restart the transmission of said unicast packets, and wherein when said primary router is not operating, turning a primary flag ON at said secondary router to become a new primary router that manages the page area with the previously received same routing information.

9. The method as claimed in claim 8, wherein said page-area managing router discards said exceeding transfer-requested packets.

10. The method as claimed in claim 8, wherein said page-area managing router is capable of setting said predetermined number for said transfer-acceptable packets.

11. The method as claimed in claim 10, wherein said predetermined number is a natural number.

12. The method as claimed in claim 8, wherein said page-area managing router is capable of setting said predetermined time period.

13. The method as claimed in claim 8, wherein said page-area managing router transmits, through said host network to a caller, a second packet-transmission suppression request which requests said caller to widen a time interval of discontinuous transmission of said packets.

14. The method as claimed in claim 8, wherein said page-area managing router transmits, through said host network to a caller, a second packet-transmission suppression request which requests said caller to stop transmission of said packet until said predetermined time period has passed, and re-start said packet transmission thereafter.

15. The communication network as claimed in claim 1, wherein said predetermined number of transfer-acceptable packets in packets received in a predetermined time period is one.

16. The method as claimed in claim 8, wherein said predetermined number of transfer-acceptable packets in packets received in a predetermined time period is one.

* * * * *